(12) United States Patent
Bassiri et al.

(10) Patent No.: US 9,288,687 B2
(45) Date of Patent: Mar. 15, 2016

(54) AUTOMATIC DETERMINATION OF COMPONENT TYPES AND LOCATIONS FOR WIRELESS NETWORK DESIGN

(71) Applicant: CONSISTEL PTE LTD, Singapore (SG)

(72) Inventors: Masoud Bassiri, Singapore (SG); Tooraj Foroughian, Singapore (SG); Duncan Karl Gordon Campbell, Singapore (SG); Hua Zhang, Singapore (SG)

(73) Assignee: CONSISTEL PTE LTD, Singapore (SG)

( * ) Notice: Subject to any disclaimer, the term of this patent is extended or adjusted under 35 U.S.C. 154(b) by 0 days.

(21) Appl. No.: 14/788,634

(22) Filed: Jun. 30, 2015

(65) Prior Publication Data

US 2015/0382204 A1 Dec. 31, 2015

Related U.S. Application Data

(63) Continuation of application No. PCT/SG2013/000003, filed on Jan. 3, 2013.

(51) Int. Cl.
*H04W 24/00* (2009.01)
*H04W 16/20* (2009.01)
*H04W 4/02* (2009.01)

(52) U.S. Cl.
CPC ............... *H04W 16/20* (2013.01); *H04W 4/02* (2013.01)

(58) Field of Classification Search
CPC ............ G06F 17/509; G06F 2217/04; G06F 2217/06; G06Q 10/087; H04L 12/2602; H04L 41/06; H04L 41/12; H04L 41/22; H04L 41/5003; H04L 43/00; H04L 43/0823; H04L 43/0847; H04L 43/0852; H04L 43/0864
See application file for complete search history.

(56) References Cited

U.S. PATENT DOCUMENTS

| | | | | |
|---|---|---|---|---|
| 2003/0023412 A1* | 1/2003 | Rappaport | ............ | H04W 16/20 703/1 |
| 2004/0236547 A1* | 11/2004 | Rappaport | ............ | G06F 17/509 703/2 |
| 2010/0014496 A1* | 1/2010 | Kalika | ................ | H04L 12/2456 370/338 |
| 2013/0183961 A1* | 7/2013 | Bassiri | .................. | H04W 16/20 455/423 |

FOREIGN PATENT DOCUMENTS

WO 2014/107137 7/2014

* cited by examiner

*Primary Examiner* — Kashif Siddiqui
(74) *Attorney, Agent, or Firm* — Beyer Law Group LLP

(57) ABSTRACT

A computer implemented method and system for determining component types and locations in a network design. The method includes automatically determining component types and locations according to a riser location as an entry point and antenna locations as a plurality of end points. The automatically determining component types and locations includes determining, by a processor of the computer, a first set of component types and locations according to a tree topology, according to the entry point and the plurality of end points, determining, by the processor, a second set of component types and locations according to a hybrid topology, according to the entry point and the plurality of end points, and determining, by the processor, one of the first set of component types and locations and the second set of component types and locations.

23 Claims, 21 Drawing Sheets

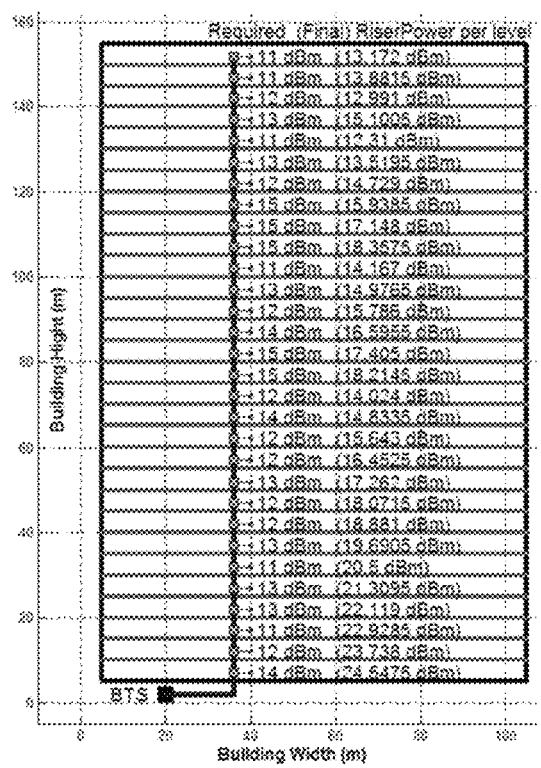 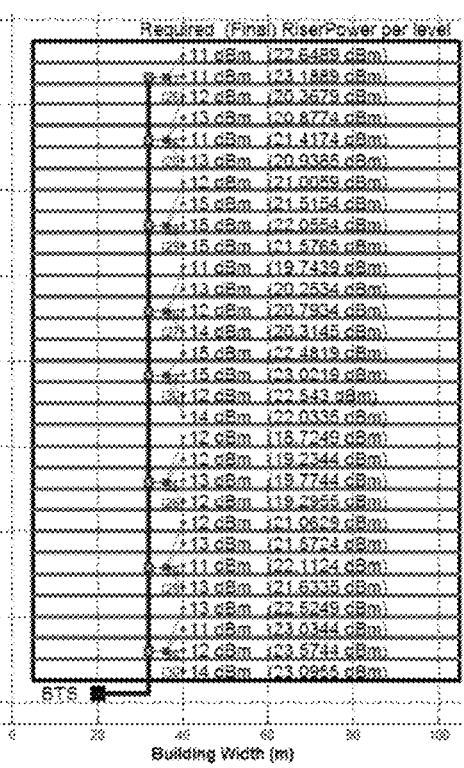
FIG. 12a  FIG. 12b

AUTOMATIC DETERMINATION OF COMPONENT TYPES AND LOCATIONS FOR WIRELESS NETWORK DESIGN

CROSS REFERENCE TO RELATED APPLICATIONS

This application is a continuation of and claims benefit to International Application No. PCT/SG2013/000003 filed on Jan. 3, 2013, entitled "Automatic Determination of Component Types and Locations for Wireless Network Design", which is incorporated by reference for all purposes.

FIELD OF THE INVENTION

The present invention relates to wireless network design. In particular, although not exclusively, the invention relates to automatic determination of component types and/or locations.

SUMMARY OF THE INVENTION

According to a first aspect, a computer implemented method of determining component types and locations in a network design is provided, the method including:

determining, by a computer processor, the component types and locations according to a riser location as an entry point and antenna locations as a plurality of end points, in a floor plan;

determining, by a computer processor, the minimum required transmission power at a riser location to meet antenna equivalent isotropically radiated power (EIRP) requirements in a floor plan;

determining, by a computer processor, the best riser location from available riser locations according to cost limitation or power transmission efficiency in a floor plan;

determining, by a computer processor, the component types and their locations according to a Base Transceiver Station (BTS) location as an entry point and riser locations in different floors as a plurality of end points, in a building plan;

determining, by a computer processor, the minimum required BTS transmission power to meet said minimum required transmission power at each riser location calculated;

updating, by a computer processor, the component locations based upon areas specified as component non-placement areas;

determining, by a computer processor, the initial types of cables according the lengths of each cable;

adjusting, by a computer processor, the sizes of some cables to increase power transmission efficiency from a BTS to antennas if the total cost budget allows;

adjusting, by a computer processor, the sizes of some cables to reduce the cable cost with the satisfaction of the antenna EIRP requirement;

determining, by a computer processor, types and locations of new components, and updating, by a computer processor, existing component types, according to the locations of new antennas for the system upgrade or enhancement.

Preferably, the computer implemented method of determining component types and locations according to an entry point and a plurality of end points in a floor plan or in a building plan include, determining the number, types and locations of splitters and cable types according to an entry point and a plurality of end points, in a tree topology;

determining the number, types and locations of couplers and cable types according to an entry point and a plurality of end points, in a bus topology;

determining the number, types and locations of splitters, couplers and cable types according to an entry point and a plurality of end points, in a hybrid topology;

determining the minimum required transmission power at an entry point according to the minimum required power at each end point in a tree, bus or hybrid topology.

Preferably, the option to choose tree, bus or hybrid topology in a floor plan or a building plan is determined based upon the floor plan, building plan, product availability, or by any other suitable means.

Preferably, the steps of determining the number, types and locations of splitters in a tree topology includes, determining the number, types and locations of a first set of splitters, wherein each end point is connected to one splitter of the first set of splitters; and subsequently determining the number, types and locations of one or more further splitters, wherein each of the first set of splitters is connected by the one or more further splitters.

Preferably, the steps of determining number, types and locations of splitters to be connected to a plurality of end points in a tree topology include, defining types of available splitters by deciding the maximum outputs of splitters;

determining number and types of splitters from available types of splitters based at least partly on the number of a plurality of end points and the remainder relationship between the number of splitter outputs and end points;

determining a group including one or two splitters, the number of outputs of which is smaller than the predefined number of maximum outputs;

determining the locations of splitters in said group based at least partly on locations of the plurality of end points to be connected and the cable length;

determining the locations of the remaining splitters based at least partly on the length of cables and the locations of the plurality of end points to be connected.

Preferably, the maximum outputs of splitters may be determined based on product availability, or by any other suitable means.

Preferably, the minimum required transmission power at a riser location, is calculated based upon the required transmission power at antennas, the power loss of cables and the insertion loss of splitters.

Preferably, the steps of determining types of splitters to be connected to splitters connected to a plurality of end points in a tree topology include, determining the number, types and locations of one or more further sets of splitters according to the number of pre-existing splitters as the end points based on computer executable instructions for performing the previously mentioned methods for determining:

(i) the number, types and locations of splitters in a tree topology, (ii) the number, types and locations of splitters to be connected to a plurality of end points in a tree topology, and (iii) the maximum outputs of splitters based on product availability, or by any other suitable means;

determining the type and location of the last splitter to be connected to an entry point, then all end points are connected to the said last splitter via one or more further set of splitters.

Preferably, the steps of determining the number, types and locations of couplers in a bus topology include, defining the number and orientation of buses, which are cable backbones;

grouping the end points according to said number and orientation of buses based upon the distance from each end point to the bus;

determining the locations of buses according to the locations of the end points in said respective groups;

determining the locations of couplers along the cable backbones according to said end points to be connected by couplers;

determining the types of couplers to be connected to said end points from available types of couplers based on the required transmission power at the end points.

Preferably, the options of the number and orientation of buses in a floor plan or a building plan are determined based upon the floor plan, building plan, product availability, or by any other suitable means.

Preferably, the steps of determining the types of said couplers includes, determining the types of couplers by the order from the coupler closest to the entry point to the coupler closest to the end points;

searching the type of each coupler from available coupler types to just meet the minimum power requirement at each end point according to the power level at the entry point;

updating the types of couplers to balance the power allocated at each end point by increasing the minimum power requirement at each end point.

Preferably, the power level at the entry point is initialized in the start stage and then updated according to the available coupler types and the minimum power requirements at the end points.

Preferably, the power at each end point is calculated based upon the coupling loss and direct loss of each coupler.

Preferably, the steps of determining the number, types and locations of splitters and couplers in a hybrid topology include, defining the maximum cable length, which is a threshold, from the end points to the bus(es) to determine the end points to be connected by couplers, and the end points to be connected by splitters;

connecting the end points that have a cable length less than a threshold directly to the bus(es) via couplers;

determining the types and locations of couplers based on computer executable instructions for performing the previously mentioned methods wherein (i) the number, types and locations of couplers in a bus topology are determined, (ii) options of the number and orientation of buses in a floor plan or a building plan are determined based upon the floor plan, building plan, product availability, or by any other suitable means, (iii) the types of said couplers are determined, (iv) the power level at the entry point is initialized in the start stage and then updated according to the available coupler types and minimum power requirements at end points, and (v) the power at each end point is calculated based upon the coupling loss and direct loss of each coupler;

connecting the remaining end points to the bus(es) via splitters;

determining the types and locations of splitters based on computer executable instructions for performing the previously mentioned methods for determining (i) the number, types and locations of splitters in a tree topology, (ii) the number, types and locations of splitters to be connected to a plurality of end points in a tree topology, (iii) the maximum outputs of splitters based on product availability, or by any other suitable means, (iv) the minimum required transmission power at a riser location, calculated based upon the required transmission power at antennas, the power loss of cables and the insertion loss of splitters, and (v) the types of splitters to be connected to splitters connected to a plurality of end points in a tree topology;

connecting the splitters to the bus(es) via couplers.

Preferably, the said maximum cable length is defined based upon the floor plan, building plan, product availability, or by any other suitable means.

Preferably, the end points to be connected by splitters and couplers can also be determined according to the cable lengths from the entry point to the end points.

Preferably, the minimum requirement transmission power at the entry point is calculated based on the required power at the end points.

Preferably, the best riser location could be different in the tree, bus and hybrid networks as there may be no single best location for all three topologies.

Preferably, some cables are selected to be adjusted in size by searching all cables in the network and verifying the total cost budget or required transmission power at the entry point and end points.

Preferably, adding new components and updating existing components for system upgrade and enhancement so as to avoid many changes to the current network structure.

Preferably, required transmission power at the entry point is re-calculated in cases of network design for system upgrade and enhancement.

Preferably, a set of solutions to connect an entry point to a plurality of end points is derived, the best solution from them can be chosen according to the specific requirements from design specification, building environments determined by floor plans and building plans, limitation of transmission power, cost budget, etc.

Preferably, the method further includes:

determining that an endpoint of the plurality of endpoints has a transmission power difference with the required transmission of the endpoint greater than a threshold;

increasing the required transmission power for each of the endpoints of the plurality of endpoints by a predetermined increment;

determining the component types and locations based upon at least the increased transmission power requirements.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which:

FIG. 12(a) and FIG. 12(b) illustrate results of a vertical bus topology and a vertical hybrid topology respectively;

Figure 1A:
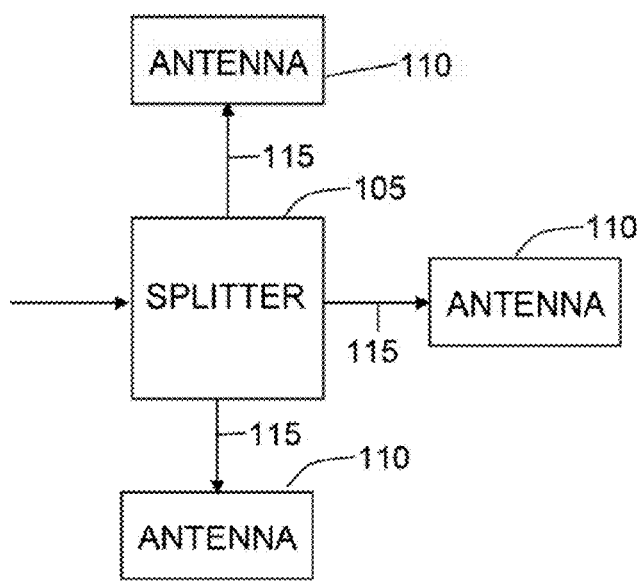
FIGS. 1a-1d diagrammatically illustrates antenna connections with different types of splitters, according to the prior art.
Figure 1B:
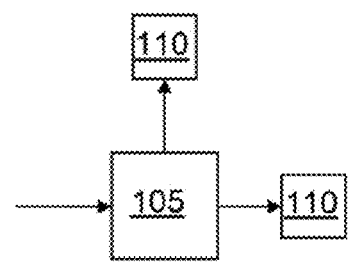
Figure 1C:
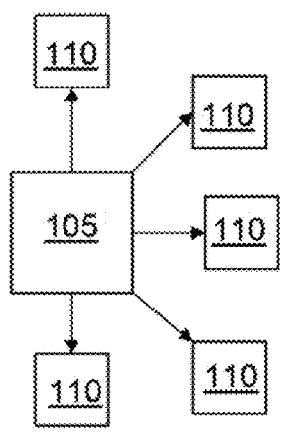
Figure 1D:
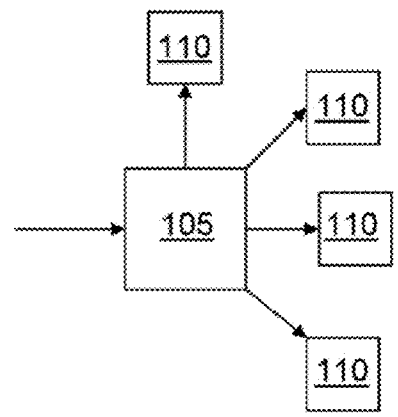

Those skilled in the art will appreciate that minor deviations from the layout of components as illustrated in the drawings will not detract from the proper functioning of the disclosed embodiments of the present invention.

DETAILED DESCRIPTION OF THE INVENTION

Embodiments of the present invention comprise systems and methods determining component types and locations in a network design. Elements of the invention are illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

According to one aspect, the invention resides in a method of determining component types and locations in a network design is provided. The method includes automatically determining component types and locations according to a riser location as an entry point and antenna locations as a plurality of end points, wherein the component types include at least splitters, couplers and cables and the automatically determining component types and locations includes: determining, by a processor of the computer, a first set of component types and locations according to a tree topology, according to the entry point and the plurality of end points; determining, by the processor, a second set of component types and locations according to a hybrid topology, according to the entry point and the plurality of end points; and determining, by the processor, one of the first set of component types and locations and the second set of component types and locations; wherein the steps of determining the component types and locations are based upon at least one of antenna equivalent isotropically radiated power (EIRP) requirements, a Base Transceiver Station (BTS) maximum transmission power, a maximum cable length, and a cost limitation.

Advantages of some embodiments of the present invention include guaranteeing the requirements of installed antennas, transmission power or financial budget. Additionally, network upgrade is simplified. These capabilities provide a user with a powerful and flexible design environment for wireless networks, which allows users to quickly and easily achieve optimal solutions with lowest cost for designing multiple service coverage areas according to different defined requirements.

Before describing embodiments of the present disclosure in detail, it is helpful to describe connections in a communications environment in which the invention may be implemented and components of the embodiments individually.

FIG. 1 diagrammatically illustrates antenna connections with different types of splitters, according to the prior art. FIG. 1(a) illustrates a splitter 105 and three antennas 110, wherein each antenna 110 is connected by cable 115 to a coupling port of the splitter 105. FIG. 1(b) illustrates a splitter 105 and two antennas 110, FIG. 1(c) illustrates a splitter 105 and five antennas 110, and FIG. 1(d) illustrates a splitter 105 with four antennas 110. As will be readily understood by a person skilled in the relevant art(s), the present invention is not restricted by a number of antennas 110 that may be connected to the splitter 105.

FIG. 2 diagrammatically illustrates tree, bus and hybrid topologies, according to the prior art.

Figure 2A:
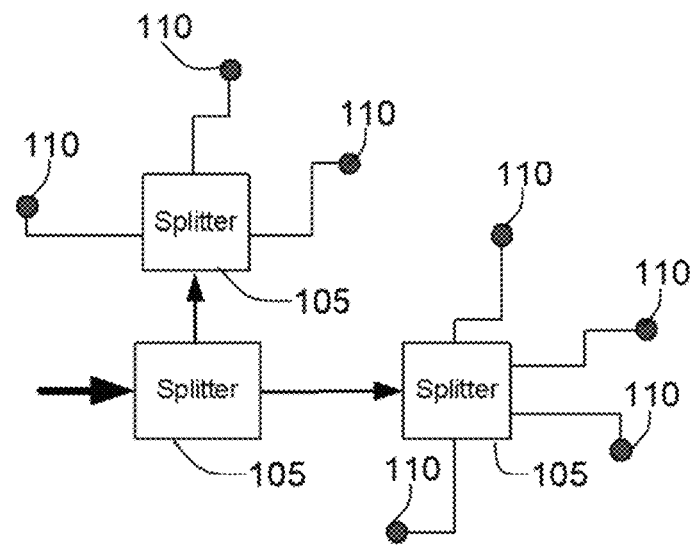
FIGS. 2a-2c diagrammatically illustrates tree, bus and hybrid topologies, according to the prior art.

FIG. 2(a) diagrammatically illustrates a tree topology, wherein a plurality of antennas 110 is connected directly by cables to splitters 105.

Figure 2B:
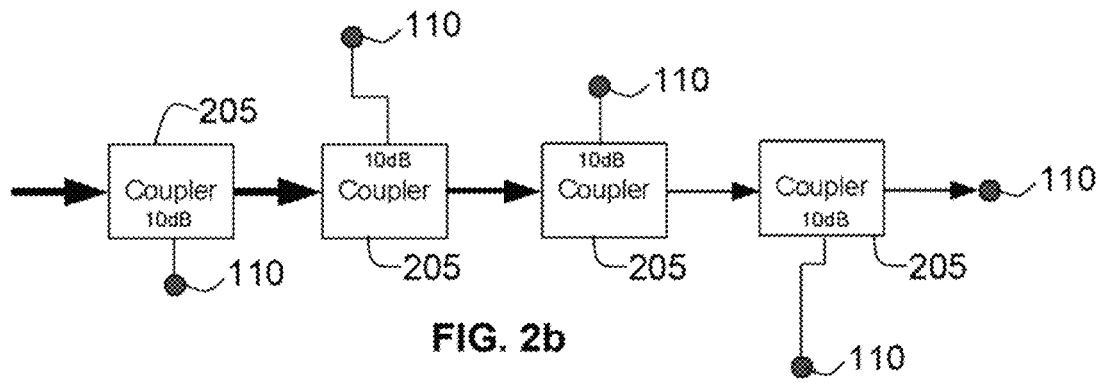

FIG. 2(b) diagrammatically illustrates a bus topology, wherein a plurality of antennas 110 are connected by cables to couplers 205. Each antenna is connected by cable to a coupling port of the couplers 205 and the connection of all direct ports forms the backbone.

Figure 2C:
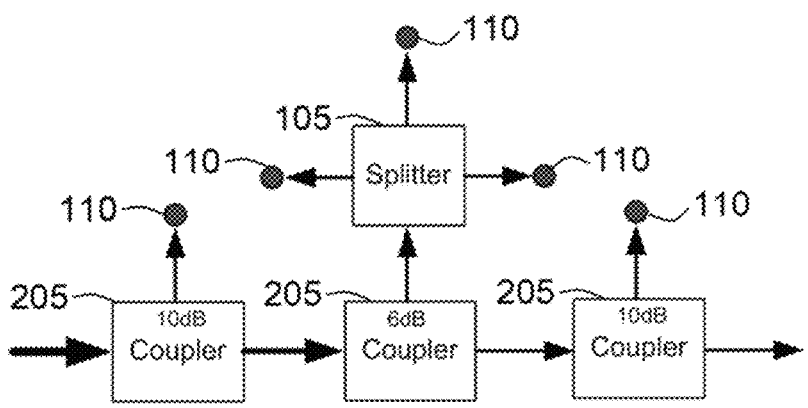

FIG. 2(c) diagrammatically illustrates a hybrid topology. Antennas 110 are connected by cables to the coupling ports of couplers 205 directly or through the splitters 105.

Generally, the tree topology, as illustrated for example in FIG. 2(a), balances the antenna equivalent isotropically radiated powers (EIRPs) better than the bus and hybrid topologies, as illustrated for example in FIGS. 2(b) and 2(c) respectively, because of the equal power division by splitters 105 in the tree topology. However, the tree topology requires more parallel cables. In the bus topology, as illustrated in FIG. 2(b) for example, only couplers are used and cable can be saved relative to the tree topology, but the antenna EIRPs are unbalanced. For these reasons, tree and hybrid topologies are the popular solutions for the indoor network design.

The cable size selection between components is initially based on the cable length. ½", ⅞", 1¼" and 1⅝" cables are the four most common cable sizes. The larger sized cable has less power attenuation but a higher cost, while the cable with the smaller size has high power loss and low cost. Therefore, the cable types are selected by the example criteria in the following table before the determination of other components' types and locations.

TABLE 1

An example of cable selection based on the cable length

| Size | Cable length |
|---|---|
| ½" | 0 < Cable length ≤ 20 m |
| ⅞" | 20 < Cable length ≤ 50 m |
| 1¼" | 50 < Cable length ≤ 150 m |
| 1⅝" | Cable length > 150 m |

To calculate the total cost, a unit price of each type of components is used. The following table lists example prices.

TABLE 2

An example of unit prices of splitters, couplers and cables

| Splitter/Coupler | Unit Price |
|---|---|
| 2-way splitter | $38 |
| 3-way splitter | $48 |
| 4-way splitter | $58 |
| 5-way splitter | $68 |
| 3 dB coupler | $38 |
| 6 dB coupler | $38 |
| 10 dB coupler | $40 |
| 15 dB coupler | $40 |
| 20 dB coupler | $40 |

| Cable Type | Cable Price | Connector |
|---|---|---|
| ½" | $3.50/m | $10.50 |
| ⅞" | $6.50/m | $15.00 |
| 1¼" | $13.80/m | $56.00 |
| 1⅝" | $50.00/m | $80.00 |

Tree Topology

To determining component types and locations according to a tree topology, types and locations of splitters are determined according to an entry point and a plurality of end points.

A riser location can be used as an entry point and antenna locations as the plurality of end points, or a Base Transceiver Station (BTS) can be used as the entry point and riser locations can be used as end points, for example. This enables the determination of component types to be applicable to levels of a building, or between levels of a building, for example.

Figure 3:
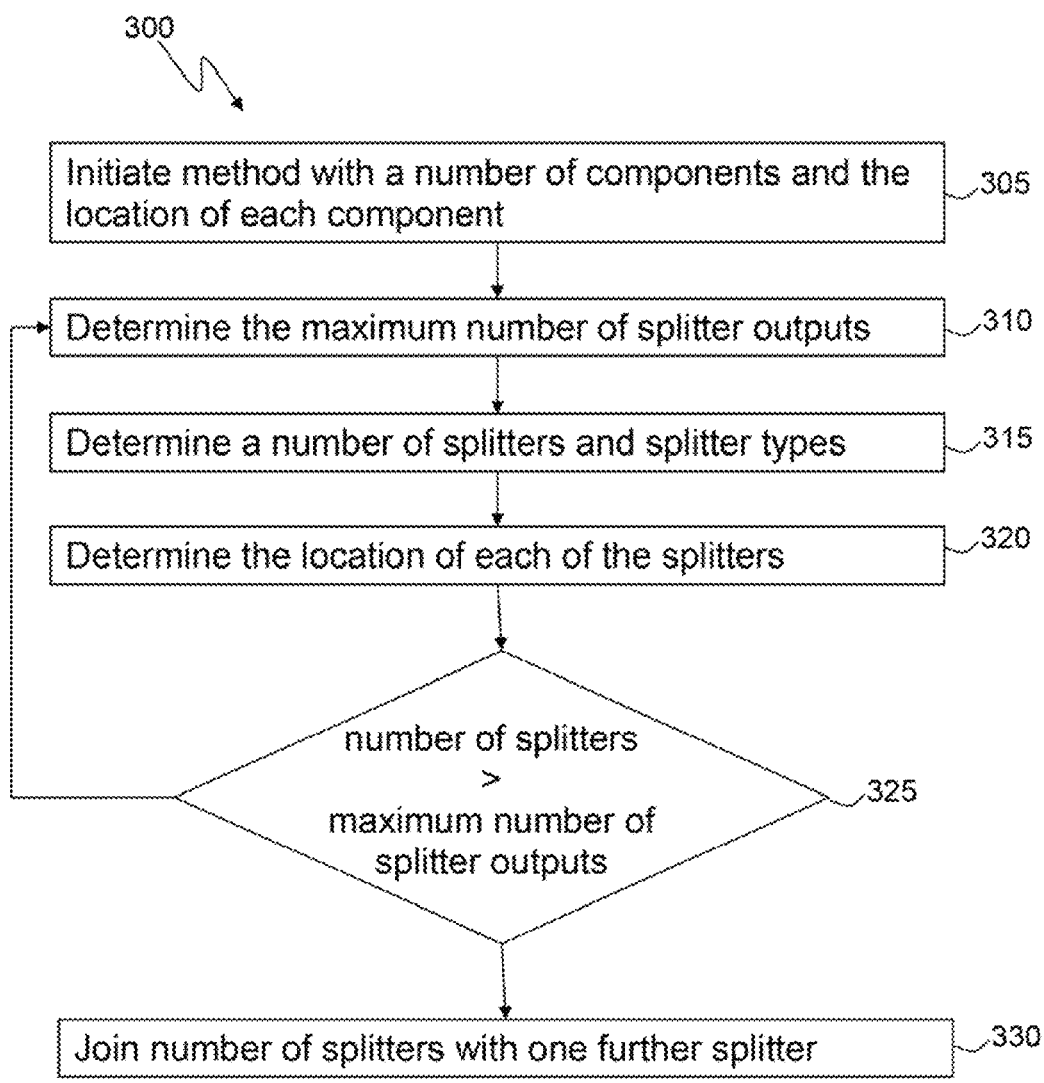
FIG. 3 diagrammatically illustrates a method for determining splitter types and locations, according to an embodiment of the present invention.

FIG. 3 diagrammatically illustrates a method 300 for determining splitter types and locations, according to an embodiment of the present invention.

In step 305, the method is initiated with a number of components, $N_T$, and a location for each of the components. The components are initially the end points, for example antennas or risers.

In step 310, the maximum number of splitter outputs, $w_{s,max}$, is determined. The maximum number of splitter outputs may be determined based on product availability, or by any other suitable means.

In step 315, a number of splitters and splitter types are determined. The number of splitters is the number of splitters required to connect directly to the components, may not be the total number of splitters.

When $N_T < 2w_{s,max}$, two splitters are sufficient to connect the components. The smallest two suitable splitter types are chosen.

When $N_T \geq 2w_{s,max}$, the splitter types and numbers are determined by:

i. If $\mod(N_T, w_{s,max}) \neq 1$, the number of splitters with $w_{s,max}$ outputs, $N_0$, is determined as $N_0 = \text{floor}(N_T/w_{s,max})$. The numbers of splitters with $w_{s,1}$ outputs is 1, where $w_1 = \mod(N_T, w_{s,max})$.

ii. If $\mod(N_T, w_{s,max}) = 1$, $w_{s,max}$ is updated to $w_{s,max} = w_{s,max} - 1$.

a. If $\mod(N_T, w_{s,max}) \neq 1$, with the updated $w_{s,max}$, $N_0 = \text{floor}(N_T/w_{s,max})$ and $w_3 = \mod(N_T, w_{s,max})$.

b. If $\mod(N_T, w_{s,max}) = 1$, with the updated $w_{s,max}$, $N_0 = \text{floor}(N_T/(w_{s,max}+1))$ and $w_{s,1} = N_T - N_0 \cdot w_{s,max}$.

As will be readily understood by a person skilled in the art, the $\mod(x, y)$ function finds the remainder of division of one number by another, e.g. $\mod(17,4) = 1$.

For example, when $w_{s,max}$ is 4 and the numbers of components, $N_T$, is 13, the numbers of required 3-way splitters are $N_0 = 3$, and one 4-way splitter is required as well because $w_{s,1} = 4$.

In step 320, the splitter locations are determined. At any given time, let CL(a) denote the least cable length between a component $a \in A$ and the closest splitter s. a and s are two-dimensional vectors denoting a component and splitter location respectively, and $\{a_x, a_y\}$ and $\{s_x, s_y\}$ represent their Cartesian coordinates.

If $w_{s,1} \neq 0$, a component near the edge of the group of components is chosen along with its closest $w_{s,1} - 1$ neighbouring components. In a floor plan, this component can correspond with a corner of the building, or if applying the method vertically, the top or bottom of the building. These components are connected by a $w_{s,1}$-way splitter, with the location of $$(s_{0,x}, s_{0,y}) = \left( \frac{\sum_{i=1}^{w_{s,1}} a_{i,x}}{w_{s,1}}, \frac{\sum_{i=1}^{w_{s,1}} a_{i,y}}{w_{s,1}} \right).$$

The remaining unconnected $N_T - w_s$ components are connected by $N_0$ splitters, each with $w_{s,max}$ outputs. In the $N_T - w_{s,1}$ components, a component, $a_1$, is chosen at random as a splitter location to be included in the defined splitter selection, $\Lambda$.

Assuming $$\Gamma_j = \frac{CL(a_j)^2}{\sum_{i=1}^{N_T - w_{s,1}} CL(a_i)^2},$$

the next splitter location, $a_j \in \{1, 2, \ldots, N_T - w_{s,1}\}$ and $a_j \notin A$, is determined which results in $\Gamma_j = \max\{\Gamma_2, \Gamma_3, \ldots, \Gamma_j, \ldots, \Gamma_K\}$. Then $a_j$ is contained into $\Lambda$. This is repeated until all the $N_0$ splitter locations have been chosen and included in $\Lambda$.

Starting with a splitter location, k, the $w_{s,max}$ components with the shortest cable length to the splitter are determined, and the splitter location is updated according to $$(s_{k,x}, s_{k,y}) = \left( \frac{\sum_{i=1}^{w_{s,max}} a_{i,x}}{w_{s,max}}, \frac{\sum_{i=1}^{w_{s,max}} a_{i,y}}{w_{s,max}} \right).$$

The process is repeated for each splitter, however only considering components not allocated to an earlier splitter, until all $N_O$ splitter locations have been updated.

At step 330, it is determined if the number of splitters placed is bigger than the maximum number of splitter outputs, $N_S > w_{s,max}$. If no, one splitter is sufficient to connect the splitters and this is performed in step 330. If yes, more than one splitter is needed and steps 310 to 325 are repeated using the splitters and splitter locations as the components, $N_T$. The process is repeated until all splitters are connected.

Figure 4:
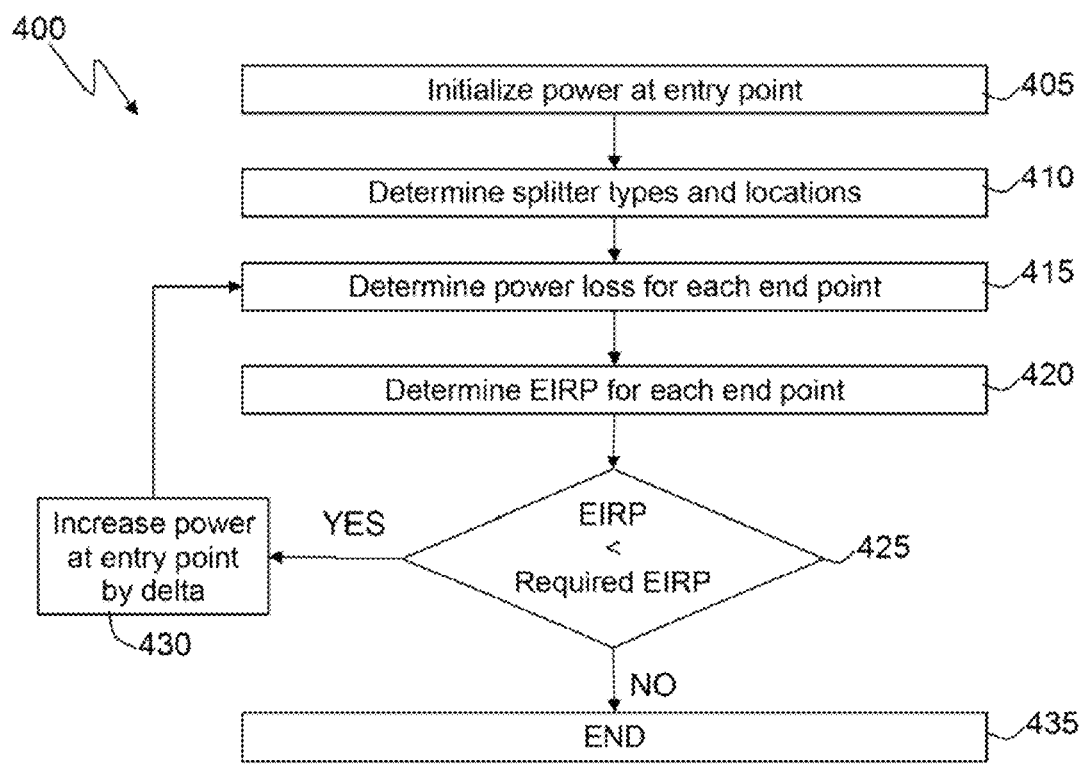
FIG. 4 illustrates a method of determined a minimum required transmission power at an entry point, according to an embodiment of the present invention.

FIG. 4 illustrates a method 400 of determined a minimum required transmission power at an entry point, according to an embodiment of the present invention. The minimum required transmission power at the entry point is calculated based upon end point power loss and end point EIRP requirements after the splitter types and locations are determined.

At step 405, the required power at the entry point is initialised to an initial value, for example 0. In order to guarantee the power requirements, a backward feedback is adopted to adjust the power at an entry point.

At step 410, the splitter types and locations are determined. The splitter types and locations can be determined using the method 300 of FIG. 3.

At step 415, the power loss for each end point is determined. The power loss from each end point to an entry point can be calculated as a summation of the splitter insertion loss and cable loss. The power loss of cables depends on the signal frequency, length and quality. Theoretical splitter insertion loss values with different output numbers can be used, or alternatively empirical insertion loss values can be used. Example splitter insertion loss values are shown in the table below.

TABLE 3

Example splitter insertion loss values (dB) with numbers of splitter outputs

| Numbers of splitter outputs | Splitter Insertion loss (dB) |
|---|---|
| 2 | 3.01 |
| 3 | 4.77 |
| 4 | 6.02 |
| 5 | 6.99 |
| 6 | 7.78 |
| 7 | 8.45 |
| 8 | 9.03 |
| 9 | 9.54 |
| 10 | 10.00 |
| 11 | 10.41 |
| 12 | 10.79 |

At step 420, the EIRP is calculated for each end point. The end point EIRP is calculated by subtracting the power loss from the power at the entry point.

At step 425, the EIRP for each end point is compared with the target end point EIRP. If the target EIRP is not met, the power at the riser is updated by adding a delta, $\Delta$, at step 430, and steps 415 to 425 are repeated until all end point EIRP values are satisfied. According to an embodiment, $\Delta$ is set to 0.1 dBm. The power at the entry point which results in the target end point EIRPs being met, i.e. at step 435, is the required minimum transmission at the entry point.

The method 400 of FIG. 4 may be applied to a floor of a building, or across floors of a building, for example.

Figures 5A, 5B:
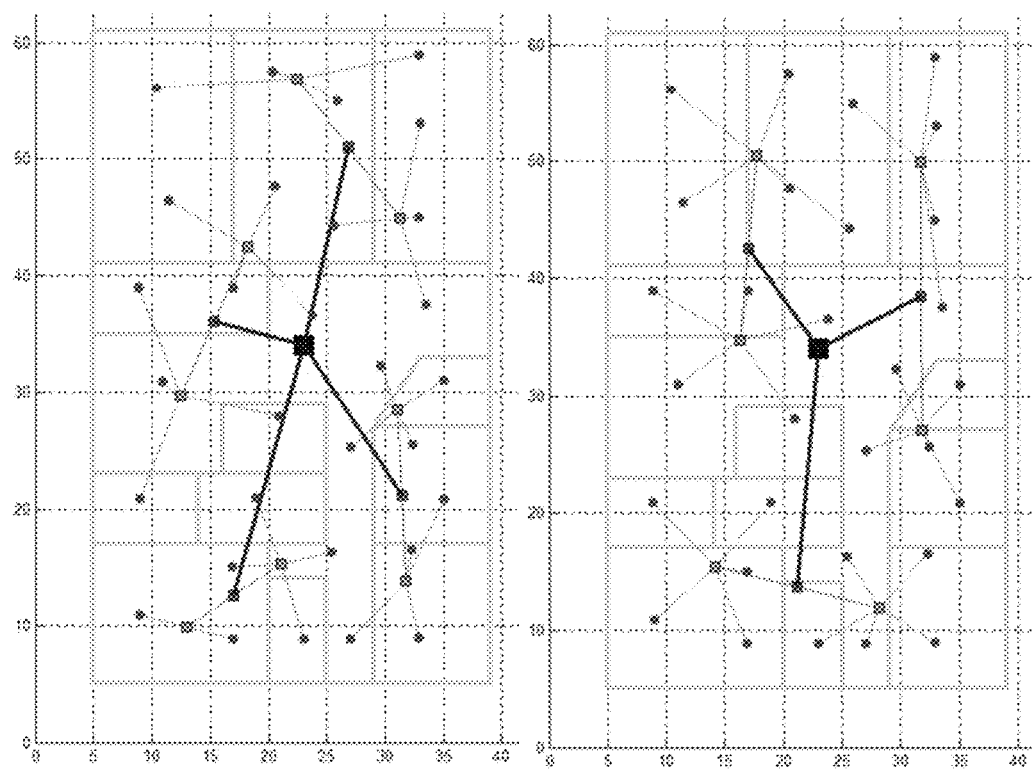
FIGS. 5a-5b illustrates results of the method of FIG. 4 on a floor of a building.

FIG. 5 illustrates results of the method 400 of FIG. 4 on a floor of a building. FIG. 5(a) illustrates the results of the method 400 when $w_{s,max}=4$. In total 13 splitters are used and a 4-way splitter is placed at the riser location to connect other splitters. FIG. 5(b) illustrates the results of the method 400 when $w_{s,max}=5$. 10 splitters are used.

TABLE 4

The antenna EIRPs and costs of the results of FIG. 5(a)

| Antenna No. | Antenna EIRP(dBm) |
|---|---|
| #1 | 5.1123 |
| #2 | 5.1123 |
| #3 | 1.669 |
| #4 | 1.3228 |
| #5 | 1.5741 |
| #6 | 1.2696 |
| #7 | 1.2086 |
| #8 | 2.1873 |
| #9 | 1.4214 |
| #10 | 1.1545 |
| #11 | 1.384 |
| #12 | 1.7707 |
| #13 | 2.054 |
| #14 | 1.3258 |
| #15 | 1.6408 |
| #16 | 1.9268 |
| #17 | 1.8501 |
| #18 | 1.7141 |
| #19 | 1.9859 |
| #20 | 1.2941 |
| #21 | 1.3639 |
| #22 | 1.6845 |
| #23 | 1.1447 |
| #24 | 1.9628 |
| #25 | 1.4867 |
| #26 | 1.1371 |
| #27 | 0.83251 |
| #28 | 1.8651 |
| #29 | 1.5722 |
| #30 | 0.85465 |

| | | | | |
|---|---|---|---|---|
| Required/Current Riser Power (dBm) | | 21 | | |
| Total EIRP (dBm) | | 16.66 | | |
| Total cost ($) | | 3063.6 | | |
| Component types | Splitter | Coupler | Cable | Connector |
| Component cost ($) | 654 | 0 | 1500.6 | 909 |
| Splitter types | | 4-way | | 5-way |
| Number of splitters | | 13 | | 0 |
| Cable types | ½" | ⅞" | 1¼" | 1⅝" |
| Cable length (m) | 300 | 70 | 0 | 0 |
| Number of connectors | 78 | 6 | 0 | 0 |

TABLE 5

The antenna EIRPs and costs of the results of FIG. 5(b)

| Antenna No. | EIRP (dBm) |
|---|---|
| #1 | 1.1373 |
| #2 | 1.1759 |
| #3 | 1.7985 |

TABLE 5-continued

The antenna EIRPs and costs of the results of FIG. 5(b)

| | |
|---|---|
| #4 | 1.0174 |
| #5 | 1.0563 |
| #6 | 1.2875 |
| #7 | 1.6951 |
| #8 | 1.3939 |
| #9 | 1.3329 |
| #10 | 1.2287 |
| #11 | 1.0174 |
| #12 | 0.74961 |
| #13 | 1.439 |
| #14 | 0.79069 |
| #15 | 0.98824 |
| #16 | 1.1264 |
| #17 | 1.5757 |
| #18 | 1.0231 |
| #19 | 0.83308 |
| #20 | 1.0505 |
| #21 | 0.90456 |
| #22 | 1.374 |
| #23 | 0.61896 |
| #24 | 0.93795 |
| #25 | 0.50852 |
| #26 | 0.33146 |
| #27 | 1.1555 |
| #28 | 1.3322 |
| #29 | 0.69057 |
| #30 | 0.73169 |

| | |
|---|---|
| Required/Current Riser Power (dBm) | 20 |
| Total EIRP (dBm) | 15.89 |
| Total cost ($) | 2739.4 |

| Component types | Splitter | Coupler | Cable | Connector |
|---|---|---|---|---|
| Component cost ($) | 570 | 0 | 1341.4 | 828 |

| Splitter types | 4-way | 5-way |
|---|---|---|
| Number of splitters | 0 | 10 |

| Cable types | ½" | ⅞" | 1-¼" | 1⅝" |
|---|---|---|---|---|
| Cable length (m) | 341.9 | 22.27 | 0 | 0 |
| Number of connectors | 76 | 2 | 0 | 0 |

The above tables illustrate the antenna EIRPs and costs of the results of FIGS. 5(a) and 5(b) respectively, with the EIRP requirement of 0 dBm. As can be seen from the tables, most antenna EIRPs are well balanced and the total component cost of $w_{s,max}=5$ is less than that of $w_{s,max}=4$ due to fewer splitters and less cable.

Bus and Hybrid Topology

To set up a bus or hybrid topology, a maximum cable length from the end points to the bus (cable backbone), $L_{max}$, is chosen. A pure bus topology corresponds with $L_{max}$ being infinity. This means all end points will be connected to the cable backbone by couplers with bus topology. If $L_{max}$ is 1 m, for example, only the end points the cable length from which to the backbone are less than 1 m will be connected with bus topology. The remaining end points are processed according to the tree topology described earlier, and the splitters are connected to the couplers on the cable backbone.

Different numbers of buses or cable backbones give different solutions and a solution is provided according to the maximum BTS transmission power or component cost limitation from the solutions with different bus numbers from zero (tree topology) to a predefined one, e.g., 4.

Figure 6:
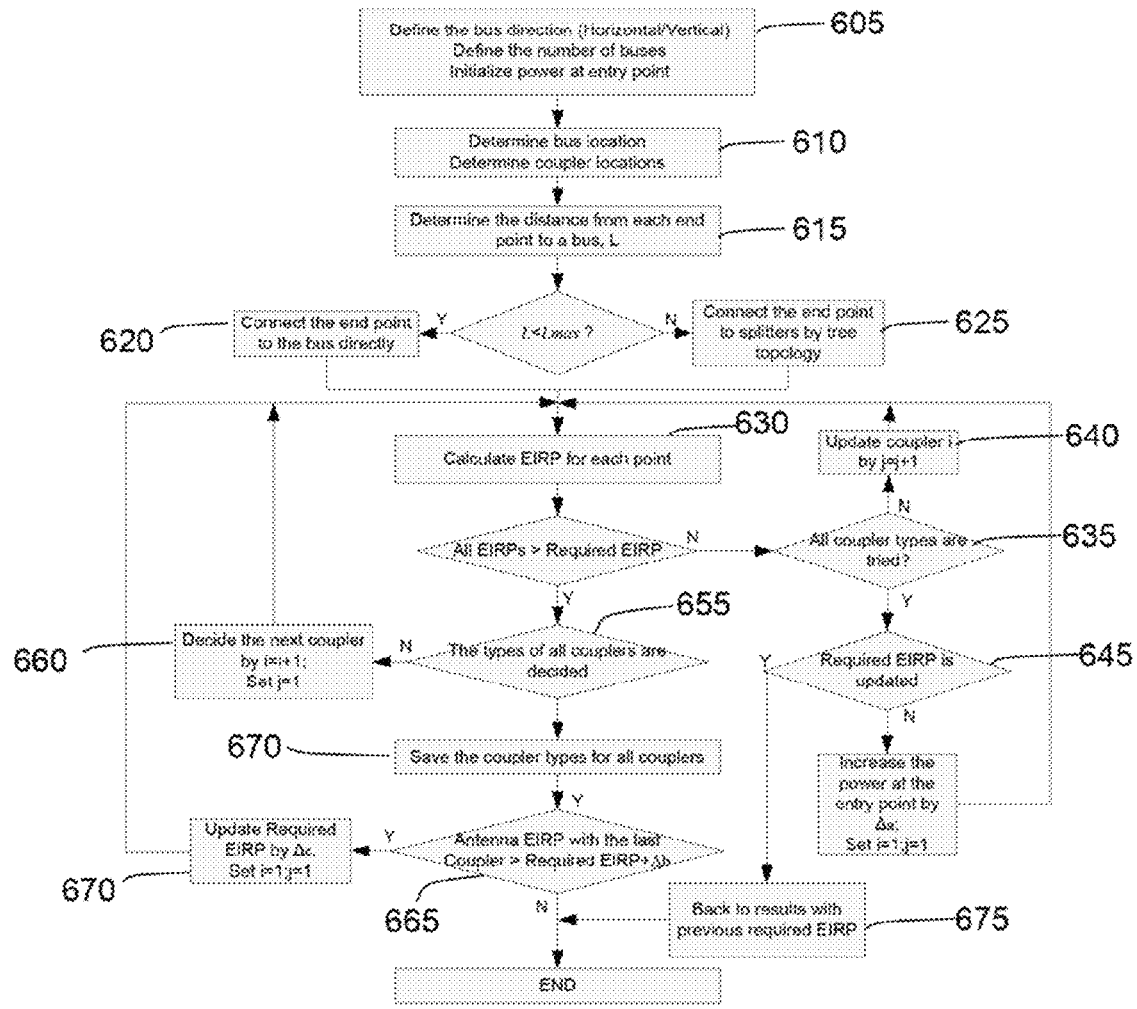
FIG. 6 illustrates a method 600 of determining the types and locations of components, according to an embodiment of the present invention.

FIG. 6 illustrates a method 600 of determining the types and locations of components, according to an embodiment of the present invention. The type of coupler is decided by its coupling loss.

The total numbers of available couplers is denoted $N_c$ with T types of the coupling losses (dB) of $\{C_j\}_{j=1}^T$ at the coupling ports, where $C_1 > C_2 > \ldots C_T$. The insertion losses (dB) at the direct ports of the couplers are $\{D_j\}_{j=1}^T$. The coupler group from 1 to $N_c$ are ranked with ascending cable length from the riser location to the couplers and the ith coupler (i=1) is the closest coupler to the riser or power transmitter in the floor.

In step 605, the method is initialised. The required power at the entry point is set to 0, the number of buses is defined and variables are initialised, i=1, j=1. This means the coupler closest to the entry point is initialized with the coupling loss of $C_1$.

In step 610, the bus location and coupler locations are determined. Initially, the centre $C_a$ of all end points, $\{c_{a,x}, c_{a,y}\}$, is determined by $$c_{a,x} = \frac{\sum_{i=1}^{N_T} a_{i,x}}{N_T}$$

and $$c_{a,y} = \frac{\sum_{i=1}^{N_T} a_{i,y}}{N_T}.$$

The bus passes through $C_a$ if the bus number is 1. If the bus numbers are b, (b>1), the end points are separated into b groups. The centre of each group is calculated with the same calculation as that when the bus number is 1. The b buses will path through these centres respectively.

At step 615, it is determined for each end point if the distance to a bus is shorter than $L_{max}$. If yes, the end points are connected to the bus directly in step 620, and a coupler is placed at the intersection of each cable and the bus. If no, the end points with a distance to the bus(es) longer than $L_{max}$, are connected by splitters in step 625, as determined by the tree topology discussed earlier, with a coupler are placed at the intersections of the bus(es) being the entry point.

In step 630, the EIRP is calculated for the end points, the power of which is transmitted through the coupler i with the coupling loss of $C_j$. The end point $$EIRP = \text{power\_at\_entrypoint} - \left(C_j + \sum_{m=1}^{j-1} D_m\right)$$

and $$EIRP = \text{power\_at\_entrypoint} - \left(C_j + SP_j + \sum_{m=1}^{j-1} D_m\right)$$

if the end point is connected to the coupler directly and through the splitter i with the splitter loss of $SP_j$.

If the end point EIRP requirement is not satisfied, it is determined in step 635 if all coupler types have been tried. If no, the type of the coupler j is updated by j=j+1 in step 640. This means that the coupler with less coupling loss is used and, the antenna EIRP is recalculated in step 630. This process is repeated until the antenna EIRP requirement is met or all coupler types have been tried. When all coupler types have been tried, i.e. j>T, it is determined if the antenna EIRP requirement has been updated in step 645, the power at the entry point is increased by $\Delta_a$ in step 650. $\Delta_a$ can be 0.5 dB or 1 dB, for example. The process from step 630 is then repeated with the updated power at the entry point.

If the antenna EIRP requirement is satisfied, in step 655 it is determined if all types of couplers have been tested. If not, the next coupler is decided in step 660 and the EIRP is determined according to step 630 until all types of couplers are determined.

Once all antenna EIRPs are guaranteed based on the coupler type determination, it is possible that the antennas, $\{a_m\}_{m=1}^X$, connected to the last coupler are allocated the remaining transmission power, which results in that the EIRP of those antennas are higher than the EIRP requirement for a certain value, $\Delta_b$, e.g., 1 dB or 3 dB. The antenna EIRPs are thus unbalanced and this is determined in step 665.

If yes, the remaining transmission power is allocated by step 670, where the antenna EIRP requirement $EIRP_{req}$ is increased according to $EIRP_{req}=EIRP_{req}+\Delta_c$ to re-determinate the coupler types according to the steps above. $\Delta_c$ can be set as 0.1 or 0.05 dB, for example. The smaller A. helps to get more balanced antenna EIRPs. The final coupler types will be determined when the gap between the EIRPs of $\{a_m\}_{m=1}^X$ and updated $EIRP_{req}$ is smaller than $\Delta_b$.

The coupler types are saved in step 670, such that if the EIRP requirements are not met, and all coupler types have been tried, the latest update of EIRP requirement will be cancelled and the determination of the coupler types will revert to the previous solution in step 675.

Figure 7A:
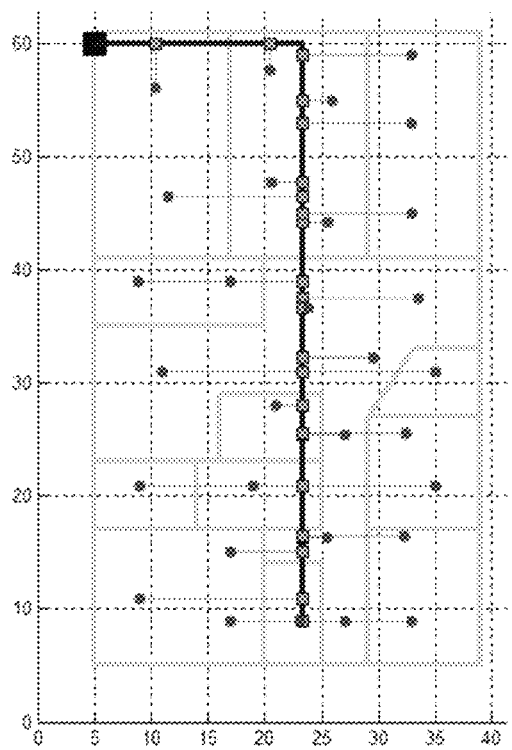
FIGS. 7a-7b illustrates results of the method of FIG. 6 on a floor of a building.
Figure 7B:
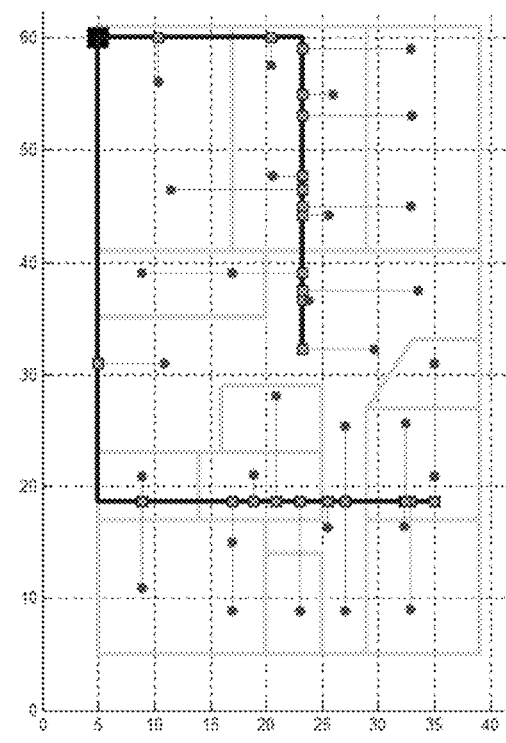

FIG. 7 illustrates results of the method 600 of FIG. 6 on a floor of a building. FIG. 7(a) illustrates an example where a single bus is used, and FIG. 7(b) illustrates an example where two buses were used.

TABLE 6

Details of the results of FIG. 7(a)

| Antenna No. | Coupler type (dB) | Coupler Location | EIRP (dBm) |
|---|---|---|---|
| #1 | 20 | (10.3851,60) | 6.0578 |
| #2 | 20 | (20.397,60) | 4.8814 |
| #3 | 20 | (23.2715,59) | 3.4587 |
| #4 | 20 | (23.2715,54.9316) | 3.4493 |
| #5 | 20 | (23.2715,53.0165) | 2.2398 |
| #6 | 20 | (23.2715,47.7041) | 2.1057 |
| #7 | 20 | (23.2715,46.4632) | 0.752 |
| #8 | 20 | (23.2715,44.9696) | 0.5255 |
| #9 | 20 | (23.2715,44.2522) | 0.8992 |
| #10 | 15 | (23.2715,39) | 4.6543 |
| #11 | 15 | (23.2715,39) | 3.5302 |
| #12 | 15 | (23.2715,37.5236) | 3.5015 |
| #13 | 15 | (23.2715,36.5978) | 4.1018 |
| #14 | 15 | (23.2715,32.2522) | 2.7688 |
| #15 | 15 | (23.2715,31) | 1.7879 |
| #16 | 15 | (23.2715,30.9614) | 1.4247 |
| #17 | 15 | (23.2715,28.0148) | 1.8372 |
| #18 | 15 | (23.2715,25.5502) | 0.5978 |
| #19 | 15 | (23.2715,25.3301) | 0.8253 |
| #20 | 10 | (23.2715,20.9597) | 5.0158 |
| #21 | 10 | (23.2715,20.9303) | 3.2944 |
| #22 | 10 | (23.2715,20.865) | 2.8551 |
| #23 | 10 | (23.2715,16.4387) | 1.9812 |
| #24 | 10 | (23.2715,16.2781) | 1.9639 |
| #25 | 10 | (23.2715,15) | 0.7036 |
| #26 | 6 | (23.2715,10.9093) | 2.7757 |
| #27 | 6 | (23.2715,8.9696) | 1.4571 |
| #28 | 6 | (23.2715,8.9188) | 0.1868 |
| #29 | 3 | (23.2715,8.865) | 2.1998 |
| #30 | 0 | (23.2715,8.865) | 1.6475 |

TABLE 6-continued

Details of the results of FIG. 7(a)

| Antenna No. | Coupler type (dB) | Coupler Location | EIRP (dBm) |
|---|---|---|---|
| Required/Current Riser Power (dBm) | | 27 | |
| Total EIRP (dBm) | | 17.48 | |
| Total cost ($) | | 4038.3 | |

| Component types | Splitter | Coupler | Cable | Connector |
|---|---|---|---|---|
| Component cost ($) | 0 | 1156 | 992.27 | 1890 |
| Splitter types | 4-way | 5-way | | |
| Number of splitters | 0 | 0 | | |
| Number of couplers | 29 | | | |
| Cable types | 1/2" | 7/8" | 1-1/4" | 1-5/8" |
| Cable length (m) | 283.5 | 0 | 0 | 0 |
| Number of connectors | 180 | 0 | 0 | 0 |

TABLE 7

Details of the results of FIG. 7(b)

| Antenna No. | Coupler type (dB) | Coupler Location | EIRP (dBm) |
|---|---|---|---|
| #1 | 15 | (10.3851,60) | 4.0578 |
| #2 | 15 | (20.397,60) | 2.8814 |
| #3 | 15 | (23.2628,59) | 1.4587 |
| #4 | 10 | (23.2628,54.9316) | 1.4493 |
| #5 | 10 | (23.2628,53.0165) | 5.2398 |
| #6 | 10 | (23.2628,47.7041) | 4.7074 |
| #7 | 10 | (23.2628,46.4632) | 2.9538 |
| #8 | 10 | (23.2628,44.9696) | 2.3255 |
| #9 | 10 | (23.2628,44.2522) | 2.2992 |
| #10 | 6 | (23.2628,39) | 4.6561 |
| #11 | 6 | (23.2628,39) | 2.232 |
| #12 | 6 | (23.2628,37.5236) | 0.9015 |
| #13 | 3 | (23.2628,36.5978) | 3.2018 |
| #14 | 0 | | 1.9688 |
| #15 | 15 | (5,30.9614) | 5.7054 |
| #16 | 15 | (8.9188,18.616) | 4.1197 |
| #17 | 15 | (8.9433,18.616) | 3.2677 |
| #18 | 15 | (16.9022,18.616) | 2.5736 |
| #19 | 15 | (16.9303,18.616) | 1.651 |
| #20 | 15 | (18.9131,18.616) | 1.8983 |
| #21 | 10 | (20.9001,18.616) | 5.6769 |
| #22 | 10 | (23,18.616) | 4.727 |
| #23 | 10 | (25.42,18.616) | 4.5358 |
| #24 | 10 | (27,18.616) | 3.2289 |
| #25 | 10 | (27,18.616) | 2.2194 |
| #26 | 10 | (32.2807,18.616) | 1.7531 |
| #27 | 6 | (32.397,18.616) | 4.5565 |
| #28 | 6 | (32.8993,18.616) | 2.629 |
| #29 | 3 | (35,18.616) | 4.5687 |
| #30 | 0 | | 3.3359 |
| Required/Current Riser Power (dBm) | | 24.76 | |
| Total EIRP (dBm) | | 18.21 | |
| Total cost ($) | | 4155.6 | |

| Component types | Splitter | Coupler | Cable | Connector |
|---|---|---|---|---|
| Component cost ($) | 0 | 1074 | 1182.6 | 1899 |
| Splitter types | 4-way | 5-way | | |
| Number of splitters | 0 | 0 | | |
| Number of couplers | 28 | | | |
| Cable types | 1/2" | 7/8" | 1-1/4" | 1-5/8" |
| Cable length (m) | 145.33 | 71.38 | 0 | 0 |
| Number of connectors | 94 | 32 | 0 | 0 |

Tables 6 and 7 provide details of the coupler types and locations, actual antenna EIRPs, required transmission at the riser, cost and other component particulars of the results of FIG. 7(a) and FIG. 7(b) respectively. Due to the unbalanced power at the coupler outputs, the actual antenna EIRPs are also not balanced, but meet the EIRP requirement of 0 dBm.

More cables are used in the bus topology, so the total component cost is much higher than the tree topology.

Figure 8A:
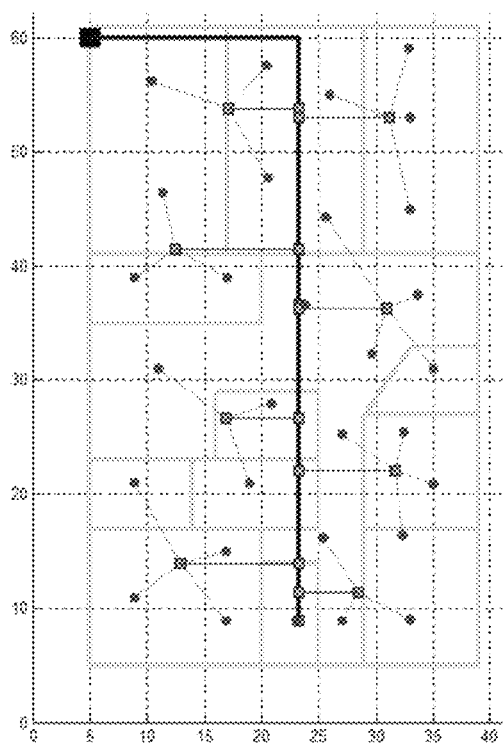
FIG. 8(a) and FIG. 8(b) illustrate results of the method of FIG. 6 with the hybrid topology.
Figure 8B:
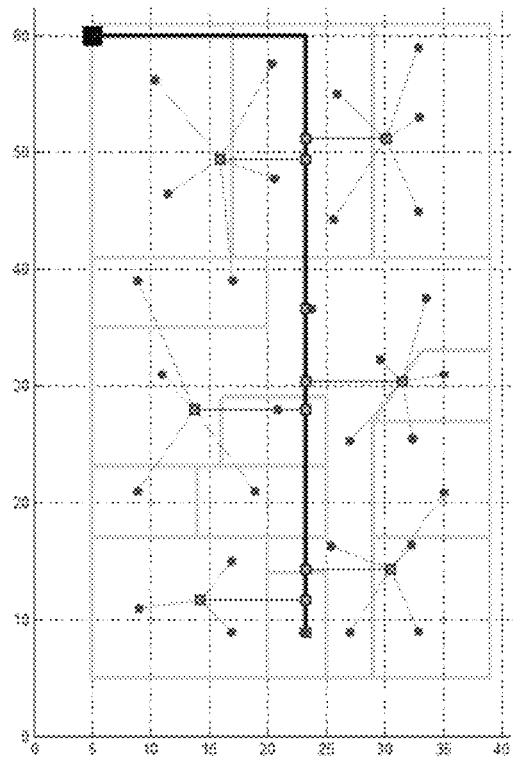

FIG. 8(*a*) and FIG. 8(*b*) illustrate results of the method 600 of FIG. 6 with the hybrid topology determined by $L_{11}=1$ m and $w_{s,max}=4$ and $w_{s,max}=5$ respectively.

TABLE 8

Details of the types and locations of splitters and couplers of FIG. 8(a)

| Antenna No. | Coupler type (dB) | Coupler Location | EIRP (dBm) |
|---|---|---|---|
| #1 | 15 | (23.2715,53.7976) | 1.6796 |
| #2 | | | 1.6796 |
| #3 | | | 1.6796 |
| #4 | 10 | (23.2715,52.9794) | 4.6974 |
| #5 | | | 4.6974 |
| #6 | | | 4.6974 |
| #7 | | | 4.6974 |
| #8 | 10 | (23.2715,41.4877) | 4.2017 |
| #9 | | | 4.2017 |
| #10 | | | 4.2017 |
| #11 | 15 | (23.2715,36.5978) | 5.0738 |
| #12 | 10 | (23.2715,36.257) | 0.95144 |
| #13 | | | 0.95144 |
| #14 | | | 0.95144 |
| #15 | | | 0.95144 |
| #16 | 10 | (23.2715,26.6453) | 1.117 |
| #17 | | | 1.117 |
| #18 | | | 1.117 |
| #19 | 6 | (23.2715,22.046) | 2.5764 |
| #20 | | | 2.5764 |
| #21 | | | 2.5764 |
| #22 | | | 2.5764 |
| #23 | 3 | (23.2715,13.9396) | 2.6416 |
| #24 | | | 2.6416 |
| #25 | | | 2.6416 |
| #26 | | | 2.6416 |
| #27 | 3 | (23.2715,11.3709) | 1.4204 |
| #28 | | | 1.4204 |
| #29 | | | 1.4204 |
| #30 | 0 | | 7.5718 |
| Required/Current Riser Power (dBm) | | 25 | |
| Total EIRP (dBm) | | 17.83 | |
| Total cost ($) | | 2148.7 | |
| Component types | Splitter | Coupler | Cable | Connector |
| Component cost ($) | 424 | 278 | 807.72 | 639 |
| Splitter types | 3-way | 4-way | | |
| Number of splitters | 4 | 4 | | |
| Number of couplers | | 9 | | |
| Cable types | 1/2" | 7/8" | 1-1/4" | 1-5/8" |
| Cable length (m) | 185.33 | 69.41 | 0 | 0 |
| Number of connectors | 58 | 20 | 0 | 0 |

TABLE 9

Details of the types and locations of splitters and couplers of FIG. 8(a)

| Antenna No. | Coupler type (dB) | Coupler Location | EIRP (dBm) |
|---|---|---|---|
| #1 | 10 | (23.2715,51.234) | 3.3711 |
| #2 | | | 3.3711 |
| #3 | | | 3.3711 |
| #4 | | | 3.3711 |
| #5 | | | 3.3711 |
| #6 | 10 | (23.2715,49.3712) | 2.3043 |
| #7 | | | 2.3043 |
| #8 | | | 2.3043 |
| #9 | | | 2.3043 |
| #10 | | | 2.3043 |
| #11 | 15 | (23.2715,36.5978) | 4.486 |

TABLE 9-continued

Details of the types and locations of splitters and couplers of FIG. 8(a)

| Antenna No. | Coupler type (dB) | Coupler Location | EIRP (dBm) |
|---|---|---|---|
| #12 | 6 | (23.2715,30.3312) | 3.5922 |
| #13 | | | 3.5922 |
| #14 | | | 3.5922 |
| #15 | | | 3.5922 |
| #16 | | | 3.5922 |
| #17 | 6 | (23.2715,27.9732) | 0.9672 |
| #18 | | | 0.9672 |
| #19 | | | 0.9672 |
| #20 | | | 0.9672 |
| #21 | | | 0.9672 |
| #22 | 3 | (23.2715,14.2833) | 1.698 |
| #23 | | | 1.698 |
| #24 | | | 1.698 |
| #25 | | | 1.698 |
| #26 | | | 1.698 |
| #27 | 3 | (23.2715,11.6094) | 0.4581 |
| #28 | | | 0.4581 |
| #29 | | | 0.4581 |
| #30 | 0 | | 6.784 |
| Required/Current Riser Power (dBm) | | 24 | |
| Total EIRP (dBm) | | 17.43 | |
| Total cost ($) | | 1867.3 | |
| Component types | Splitter | Coupler | Cable | Connector |
| Component cost ($) | 388 | 238 | 728.3 | 513 |
| Splitter types | 3-way | 4-way | 5-way | |
| Number of splitters | 1 | 0 | 5 | |
| Number of couplers | | 7 | | |
| Cable types | 1/2" | 7/8" | 1-1/4" | 1-5/8" |
| Cable length (m) | 157.87 | 68.7 | 0 | 0 |
| Number of connectors | 46 | 16 | 0 | 0 |

Tables 8 and 9 provide details of the types and locations of splitters and couplers of FIG. 8(*a*) and FIG. 8(*b*) respectively. The antenna EIRP requirement of 0 dBm is guaranteed and there is not much difference in the required transmission power and cost between the two solutions.

FIG. 9(*a*) illustrates results of the method 600 of FIG. 6 with 2 buses with different bus directions, FIG. 9(*b*) illustrates results of the method 600 of FIG. 6 with 2 buses with the same bus direction, FIG. 9(*c*) illustrates results of the method 600 of FIG. 6 with 3 buses with different bus directions, and FIG. 9(*d*) illustrates results of the method 600 of FIG. 6 with 3 buses with the same bus directions.

TABLE 10

Figure 9A:
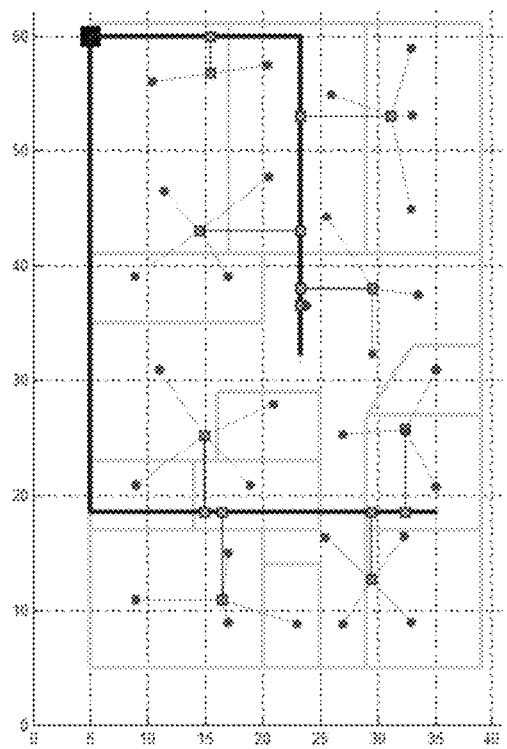
FIG. 9(a) illustrates results of the method of FIG. 6 with 2 buses with different bus directions.

Details of the results of FIG 9(a)

| Antenna No. | Coupler type (dB) | Coupler Location | EIRP (dBm) |
|---|---|---|---|
| #1 | 10 | (15.3911,60) | 4.8376 |
| #2 | | | 4.8376 |
| #3 | 6 | (23.2628,52.9794) | 2.2255 |
| #4 | | | 2.2255 |
| #5 | | | 2.2255 |
| #6 | | | 2.2255 |
| #7 | 3 | (23.2628,43.0418) | 2.4172 |
| #8 | | | 2.4172 |
| #9 | | | 2.4172 |
| #10 | | | 2.4172 |
| #11 | 3 | (23.2628,38.0093) | 0.4138 |
| #12 | | | 0.4138 |
| #13 | | | 0.4138 |
| #14 | 0 | | 7.0018 |
| #15 | 10 | (14.9233,18.616) | 1.3982 |

TABLE 10-continued

Details of the results of FIG 9(a)

| Antenna No. | Coupler type (dB) | Coupler Location | EIRP (dBm) |
|---|---|---|---|
| #16 | | | 1.3982 |
| #17 | | | 1.3982 |
| #18 | | | 1.3982 |
| #19 | 6 | (16.444,18.616) | 4.6028 |
| #20 | | | 4.6028 |
| #21 | | | 4.6028 |
| #22 | | | 4.6028 |
| #23 | 6 | (29.4,18.616) | 1.9586 |
| #24 | | | 1.9586 |
| #25 | | | 1.9586 |
| #26 | | | 1.9586 |
| #27 | | (32.3492,18.616) | 2.9117 |
| #28 | | | 2.9117 |
| #29 | | | 2.9117 |
| #30 | 0 | | 13.65 |
| Required/Current Riser Power (dBm) | | 24 | |
| Total EIRP (dBm) | | 19.16 | |
| Total cost ($) | | 2650.3 | |
| Component types | Splitter | Coupler | Cable | Connector |
| Component cost ($) | 434 | 236 | 1259.3 | 721 |
| Splitter types | 2-way | 3-way | 4-way | |
| Number of splitters | 1 | 2 | 5 | |
| Number of couplers | 8 | | | |
| Cable types | 1/2" | 7/8" | 1-1/4" | 1-5/8" |
| Cable length (m) | 52.7 | 0 | 41.67 | 0 |
| Number of connectors | 28 | 0 | 10 | 0 |

TABLE 11

Figure 9B:
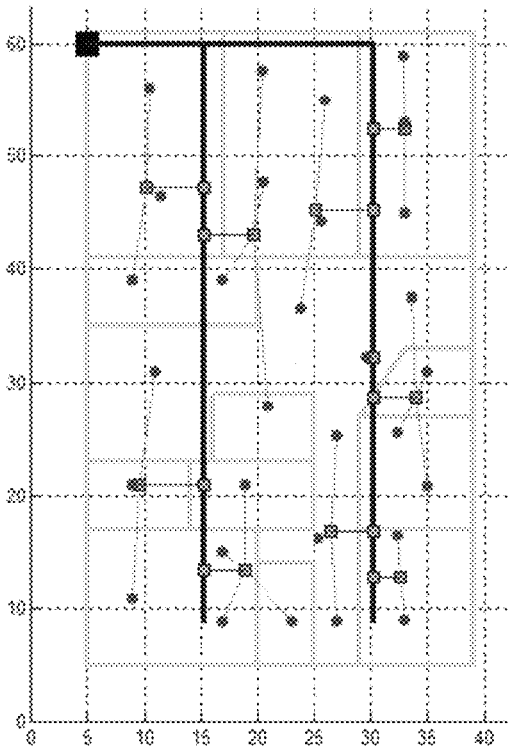
FIG. 9(b) illustrates results of the method of FIG. 6 with 2 buses with the same bus direction.

Details of the results of FIG 9(b)

| Antenna No. | Coupler type (dB) | Coupler Location | EIRP (dBm) |
|---|---|---|---|
| #1 | 10 | (30.2575,52.3287) | 2.7663 |
| #2 | | | 2.7663 |
| #3 | | | 2.7663 |
| #4 | 10 | (30.2575,45.2605) | 0.7691 |
| #5 | | | 0.7691 |
| #6 | | | 0.7691 |
| #7 | 15 | (30.2575,32.2522) | 0.571 |
| #8 | 6 | (30.2575,28.7347) | 0.962 |
| #9 | | | 0.962 |
| #10 | | | 0.962 |
| #11 | | | 0.962 |
| #12 | 3 | (30.2575,16.8244) | 2.5629 |
| #13 | | | 2.5629 |
| #14 | | | 2.5629 |
| #15 | 0 | | 4.6993 |
| #16 | | | 4.6993 |
| #17 | 10 | (15.2876,47.2006) | 3.8685 |
| #18 | | | 3.8685 |
| #19 | | | 3.8685 |
| #20 | 10 | (15.2876,43.0673) | 0.7317 |
| #21 | | | 0.7317 |
| #22 | | | 0.7317 |
| #23 | | | 0.7317 |
| #24 | 6 | (15.2876,20.9337) | 4.513 |
| #25 | | | 4.513 |
| #26 | | | 4.513 |
| #27 | 6 | (15.2876,13.4359) | 1.2358 |
| #28 | | | 1.2358 |
| #29 | | | 1.2358 |
| #30 | | | 1.2358 |
| Required/Current Riser Power (dBm) | | 24 | |
| Total EIRP (dBm) | | 18.09 | |
| Total cost ($) | | 2877.6 | |

TABLE 11-continued

Details of the results of FIG 9(b)

| | | | | |
|---|---|---|---|---|
| Component types | Splitter | Coupler | Cable | Connector |
| Component cost ($) | 538 | 316 | 1240.6 | 783 |
| Splitter types | 2-way | 3-way | 4-way | |
| Number of splitters | 2 | 5 | 4 | |
| Number of couplers | 9 | | | |
| Cable types | 1/2" | 7/8" | 1-1/4" | 1-5/8" |
| Cable length (m) | 133.3 | 72.5 | 0 | 0 |
| Number of connectors | 34 | 12 | 0 | 0 |

TABLE 12

Figure 9C:
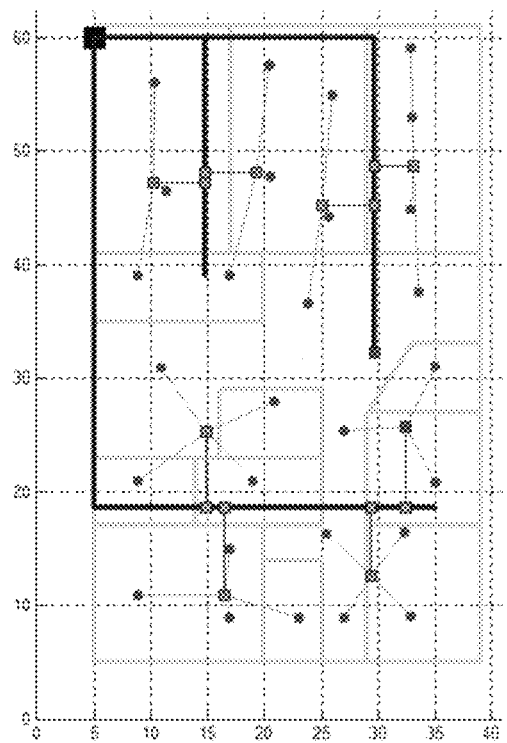
FIG. 9(c) illustrates results of the method of FIG. 6 with 3 buses with different bus directions.

Details of the results of FIG. 9(c)

| Antenna No. | Coupler type (dB) | Coupler Location | EIRP (dBm) |
|---|---|---|---|
| #1 | 6 | (14.9233,18.616) | 2.3982 |
| #2 | | | 2.3982 |
| #3 | | | 2.3982 |
| #4 | | | 2.3982 |
| #5 | 6 | (16.444,18.616) | 0.7028 |
| #6 | | | 0.7028 |
| #7 | | | 0.7028 |
| #8 | | | 0.7028 |
| #9 | 3 | (29.4,18.616) | 1.058 |
| #10 | | | 1.058 |
| #11 | | | 1.058 |
| #12 | | | 1.058 |
| #13 | 0 | | 0.4117 |
| #14 | | | 0.4117 |
| #15 | | | 0.4117 |
| #16 | 10 | (14.7596,48.0848) | 0.8146 |
| #17 | | | 0.8146 |
| #18 | | | 0.8146 |
| #19 | 6 | (14.7596,47.2006) | 1.1067 |
| #20 | | | 1.1067 |
| #21 | | | 1.1067 |
| #22 | 6 | (29.6403,48.6274) | 2.6788 |
| #23 | | | 2.6788 |
| #24 | | | 2.6788 |
| #25 | | | 2.6788 |
| #26 | 0 | | 2.1299 |
| #27 | | | 2.1299 |
| #28 | | | 2.1299 |
| #29 | | | 2.1299 |
| #30 | 10 | (29.6403,32.2522) | 2.0319 |
| Required/Current Riser Power (dBm) | | 23.77 | |
| Total EIRP (dBm) | | 18.01 | |
| Total cost ($) | | 3932.8 | |
| Component types | Splitter | Coupler | Cable | Connector |
| Component cost ($) | 608 | 318 | 2132.8 | 874 |
| Splitter types | 2-way | 3-way | 4-way | |
| Number of splitters | 0 | 4 | 5 | |
| Number of couplers | 7 | | | |
| Cable types | 1/2" | 7/8" | 1-1/4" | 1-5/8" |
| Cable length (m) | 77.89 | 68.73 | 0 | 0 |
| Number of connectors | 22 | 8 | 0 | 0 |

TABLE 13

Figure 9D:
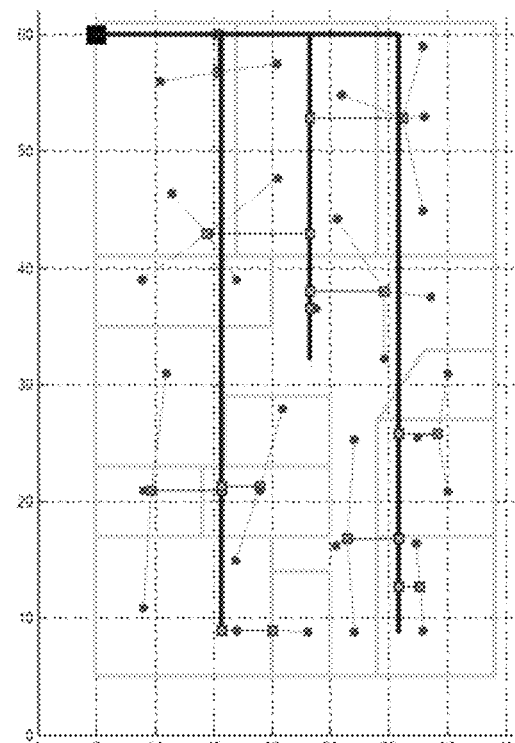
FIG. 9(d) illustrates results of the method of FIG. 6 with 3 buses with the same bus directions.

Details of the results of FIG. 9(d)

| Antenna No. | Coupler type (dB) | Coupler Location | EIRP (dBm) |
|---|---|---|---|
| #1 | 10 | (15.3911,60) | 4.8376 |
| #2 | | | 4.8376 |

TABLE 13-continued

Details of the results of FIG. 9(d)

| Antenna No. | Coupler type (dB) | Coupler Location | EIRP (dBm) |
|---|---|---|---|
| #3 | 6 | (23.2628,52.9794) | 2.2255 |
| #4 | | | 2.2255 |
| #5 | | | 2.2255 |
| #6 | | | 2.2255 |
| #7 | 3 | (23.2628,43.0418) | 2.4172 |
| #8 | | | 2.4172 |
| #9 | | | 2.4172 |
| #10 | | | 2.4172 |
| #11 | 3 | (23.2628,38.0093) | 0.41377 |
| #12 | | | 0.41377 |
| #13 | | | 0.41377 |
| #14 | 0 | (23.2628,36.5978) | 7.0018 |
| #15 | 6 | (15.6837,21.3248) | 3.619 |
| #16 | | | 3.619 |
| #17 | | | 3.619 |
| #18 | 6 | (15.6837,20.9337) | 1.4135 |
| #19 | | | 1.4135 |
| #20 | | | 1.4135 |
| #21 | 0 | (15.6837,8.8919) | 1.7171 |
| #22 | | | 1.7171 |
| #23 | 6 | (30.8746,25.8051) | 5.1973 |
| #24 | | | 5.1973 |
| #25 | | | 5.1973 |
| #26 | 6 | (30.8746,16.8244) | 2.263 |
| #27 | | | 2.263 |
| #28 | | | 2.263 |
| #29 | 0 | (30.8746,12.7042) | 3.1252 |
| #30 | | | 3.1252 |
| Required/Current Riser Power (dBm) | | | 24.5 |
| Total EIRP (dBm) | | | 19.8 |
| Total cost ($) | | | 3733.8 |
| Component types | Splitter | Coupler | Cable | Connector |
| Component cost ($) | 566 | 350 | 1772.8 | 1045 |
| Splitter types | 2-way | 3-way | 4-way | |
| Number of splitters | 3 | 6 | 2 | |
| Number of couplers | 8 | | | |
| Cable types | 1/2" | 7/8" | 1-1/4" | 1-5/8" |
| Cable length (m) | 27.15 | 0 | 41.66 | 0 |
| Number of connectors | 28 | 0 | 10 | 0 |

Tables 10 and 11 provide further details of the results of FIG. 9(a) and FIG. 9(b) respectively, and Tables 12 and 13 provide further details of the results of FIG. 9(c) and FIG. 9(d) respectively. The total cost increases with the bus numbers because the cable length increases.

Vertical Topology

Once the types and locations of splitters and couplers are determined horizontally using the methods described earlier, the same methods may be applied to a building vertically. The required transmission power at the riser of each floor is given as the end point requirements.

Figure 10:
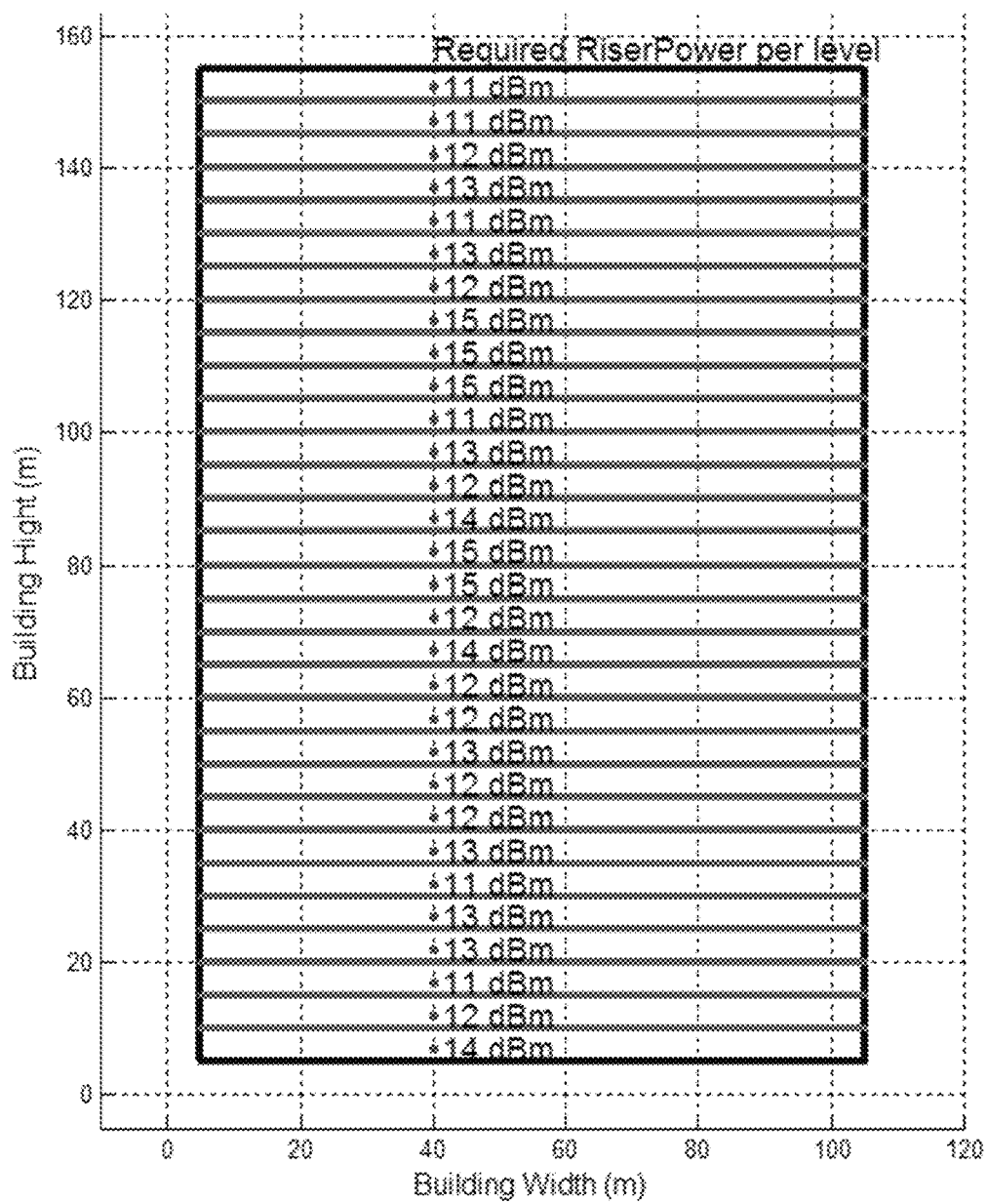
FIG. 10 illustrates an example of a building with multiple floors and the required transmission power on each floor.

FIG. 10 illustrates an example of a building with multiple floors and the required transmission power on each floor.

The method 600 of FIG. 6, the method 300 of FIG. 3 and the method 400 of FIG. 4 are then used vertically using the BTS as the entry point and the risers (one per floor) as end points. The splitters and couplers which connect the components at the riser per floor are then determined.

Since the cable lengths from the riser locations to the bus are the same vertically, an $L_{max}$ need not be defined in the vertical hybrid topology. The main difference between horizontal and vertical topologies is the location calculations of splitters, $s_0$ and $$\{s_k\}_{k=1}^{N_0}.$$

Based on the horizontal topology and K building levels, the power at all risers, $$\{r_k\}_{k=1}^{K},$$

are calculated. Prower($r_k$) is defined as the required power at the riser of the kth level. Therefore, the coordinates of $s_0$ and $$\{s_k\}_{k=1}^{N_0}$$

can be calculated based on the following formulas, $$\begin{cases} s_{0,x} = r_{1,x} \cdot \dfrac{\text{Power}(r_{1,k})}{\sum\limits_{i=1}^{w_{s,1}} \text{power}(r_{i,k})} + r_{2,x} \cdot \dfrac{\text{Power}(r_{2,k})}{\sum\limits_{i=1}^{w_{s,1}} \text{power}(r_{i,k})} + \ldots + r_{w_{s,1},x} \cdot \dfrac{\text{power}(r_{w_{s,1},k})}{\sum\limits_{i=1}^{w_{s,1}} \text{power}(r_{i,k})} \\ s_{0,y} = r_{1,y} \cdot \dfrac{\text{Power}(r_{1,k})}{\sum\limits_{i=1}^{w_{s,1}} \text{power}(r_{i,k})} + r_{2,y} \cdot \dfrac{\text{Power}(r_{2,k})}{\sum\limits_{i=1}^{w_{s,1}} \text{power}(r_{i,k})} + \ldots + r_{w_{s,1},y} \cdot \dfrac{\text{power}(r_{w_{s,1},k})}{\sum\limits_{i=1}^{w_{s,1}} \text{power}(r_{i,k})} \end{cases}$$

and $$\begin{cases} s_{k,x} = r_{1,x} \cdot \dfrac{\text{Power}(r_{1,k})}{\sum\limits_{i=1}^{w_{s,max}} \text{power}(r_{i,k})} + r_{2,x} \cdot \dfrac{\text{Power}(r_{2,k})}{\sum\limits_{i=1}^{w_{s,max}} \text{power}(r_{i,k})} + \ldots + r_{w_{s,max},x} \cdot \dfrac{\text{power}(r_{w_{s,max},k})}{\sum\limits_{i=1}^{w_{s,max}} \text{power}(r_{i,k})} \\ s_{k,y} = r_{1,y} \cdot \dfrac{\text{Power}(r_{1,k})}{\sum\limits_{i=1}^{w_{s,max}} \text{power}(r_{i,k})} + r_{2,y} \cdot \dfrac{\text{Power}(r_{2,k})}{\sum\limits_{i=1}^{w_{s,max}} \text{power}(r_{i,k})} + \ldots + r_{w_{s,max},y} \cdot \dfrac{\text{power}(r_{w_{s,max},k})}{\sum\limits_{i=1}^{w_{s,max}} \text{power}(r_{i,k})} \end{cases}$$

Figure 11A:
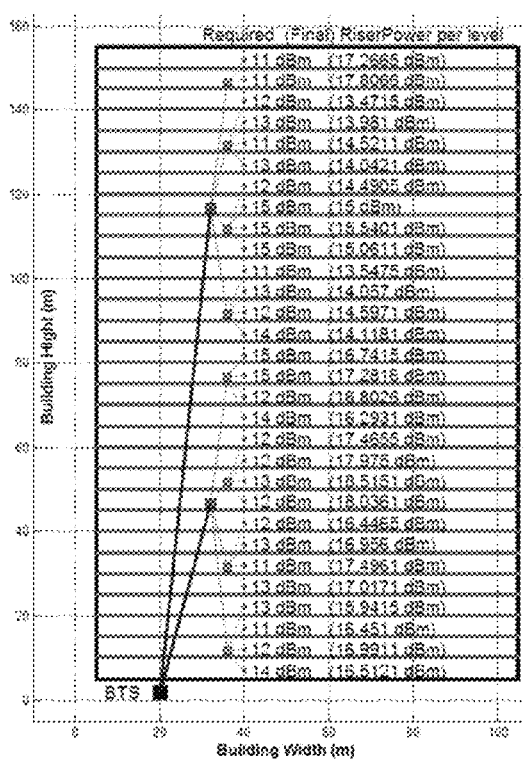
FIG. 11(a) illustrates results of splitter types and locations, and actual transmission power at each riser location for a vertical tree topology with maximum splitter output 4.
Figure 11B:
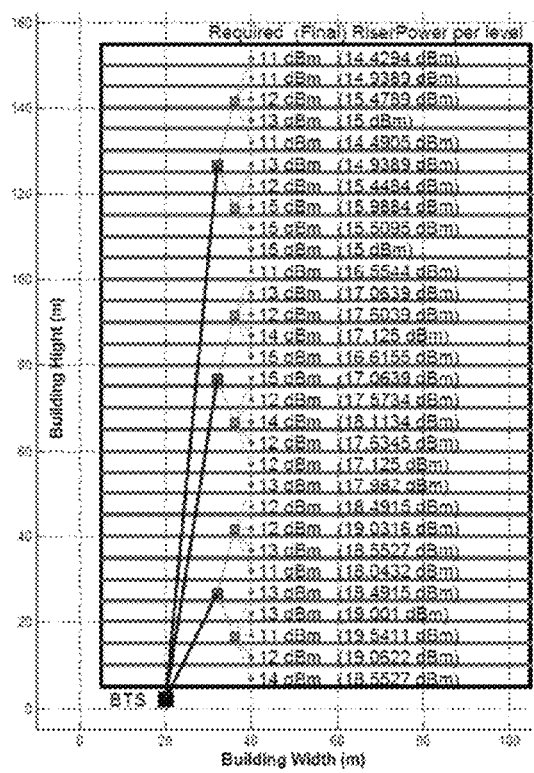
FIG. 11(b) illustrates results of splitter types and locations, and actual transmission power at each riser location for a vertical tree topology with maximum splitter output 5.

FIG. 11(a) illustrates results of splitter types and locations, and actual transmission power at each riser location for a vertical tree topology with maximum splitter output 4, and FIG. 11(b) illustrates results of splitter types and locations, and actual transmission power at each riser location for a vertical tree topology with maximum splitter output 5.

TABLE 14

Details of the results of FIG. 11(a)

| Required BTS Power (dBm) | | | 38.37 | | |
|---|---|---|---|---|---|
| Total cost ($) | | | 5806.7 | | |
| Component types | Splitter | Coupler | Cable | Connector | Jumper |
| Component cost ($) | 598 | 0 | 4185.5 | 133 | 133.2 |
| Splitter types | | 2-way | 3-way | 4-way | |
| Number of splitters | | 2 | 0 | 7 | |
| Jumper types | | 0.3 m | | 1 m | |
| Number of jumpers | | 4 | | 4 | |
| Number of couplers | | | 0 | | |
| Cable types | ½" | ⅞" | 1¼" | 1⅝" | |
| Cable length (m) | 186.8 | 120 | 199.4 | 0 | |
| Number of connectors | 52 | 8 | 4 | 0 | |

TABLE 15

Details of the results of FIG. 11(b)

| Required BTS Power (dBm) | | | 38.86 | | |
|---|---|---|---|---|---|
| Total cost ($) | | | 6038.97 | | |
| Component types | Splitter | Coupler | Cable | Connector | Jumper |
| Component cost ($) | 570 | 0 | 4486.77 | 884 | 98.2 |
| Splitter types | | 3-way | 4-way | 5-way | |
| Number of splitters | | 1 | 0 | 6 | |
| Jumper types | | 0.3 m | | 1 m | |
| Number of jumpers | | 4 | | 2 | |
| Number of couplers | | | 0 | | |
| Cable types | ½" | ⅞" | 1¼" | 1⅝" | |
| Cable length (m) | 255 | 44.7 | 239.4 | 0 | |
| Number of connectors | 60 | 2 | 4 | 0 | |

Tables 14 and 15 illustrate details of the results of FIG. 11(a) and FIG. 11(b) respectively. The required transmission power at all riser locations in multiple floors is satisfied. The total required BTS transmission power in both situations is around 38 dBm and there is not a large cost difference. The disadvantage of the tree topology in the vertical connection is that more parallel cables are installed in order to balance the power. Consequently, the total cost in the bus topology is much lower than that in the tree topology, which is opposite to the comparison between the two topologies in the horizontal connection described earlier.

FIG. 12(a) and FIG. 12(b) illustrate results of a vertical bus topology and a vertical hybrid topology respectively. In the hybrid topology, the splitters connected to the components in the risers are connected to the BTS by couplers. One-level cascade of splitters is used in the basic hybrid topology; meaning only one splitter is installed between the bus and the connection port in each floor.

TABLE 16

Details of the vertical bus topology of FIG. 12(a)

| Coupler No. | Coupler Type(dB) | Coupler Location |
|---|---|---|
| #1 | 20 | (40, 7) |
| #2 | 20 | (40, 12) |
| #3 | 20 | (40, 17) |
| #4 | 20 | (40, 22) |
| #5 | 20 | (40, 27) |
| #6 | 20 | (40, 32) |
| #7 | 20 | (40, 37) |
| #8 | 20 | (40, 42) |
| #9 | 20 | (40, 47) |
| #10 | 20 | (40, 52) |
| #11 | 20 | (40, 57) |
| #12 | 20 | (40, 62) |
| #13 | 20 | (40, 67) |
| #14 | 20 | (40, 72) |
| #15 | 15 | (40, 77) |
| #16 | 15 | (40, 82) |
| #17 | 15 | (40, 87) |
| #18 | 15 | (40, 92) |
| #19 | 15 | (40, 97) |
| #20 | 15 | (40, 102) |
| #21 | 10 | (40, 107) |
| #22 | 10 | (40, 112) |
| #23 | 10 | (40, 117) |
| #24 | 10 | (40, 122) |
| #25 | 10 | (40, 127) |
| #26 | 10 | (40, 132) |
| #27 | 6 | (40, 137) |
| #28 | 6 | (40, 142) |
| #29 | 3 | (40, 147) |
| #30 | 0 | (40, 152) |

| Required BTS Power (dBm) | | | 46 | | |
|---|---|---|---|---|---|
| Total cost ($) | | | 2861 | | |
| Component types | Splitter | Coupler | Cable | Connector | Jumper |
| Component cost ($) | 0 | 1078 | 670 | 639 | 474 |
| Splitter types | | 3-way | | 4-way | |
| Number of splitters | | 0 | | 0 | |
| Jumper types | | 0.3 m | | 1 m | |
| Number of jumpers | | 29 | | 0 | |
| Number of couplers | | | 29 | | |
| Cable types | ½" | ⅞" | 1¼" | 1⅝" | |
| Cable length (m) | 145 | 25 | 0 | 0 | |
| Number of connectors | 58 | 2 | 0 | 0 | |

TABLE 17

Details of the vertical bus topology of FIG. 12(b)

| Coupler No. | Coupler Type(dB) | Coupler Location |
|---|---|---|
| #1 | 15 | (40, 11.7) |
| #2 | 15 | (40, 31.7) |
| #3 | 15 | (40, 51.7) |
| #4 | 10 | (40, 76.7) |
| #5 | 10 | (40, 91.7) |
| #6 | 6 | (40, 111.7) |
| #7 | 3 | (40, 131.7) |
| #8 | 0 | (40, 146.7) |

| Required BTS Power (dBm) | 47 |
|---|---|
| Total cost ($) | 2912 |

TABLE 17-continued

Details of the vertical bus topology of FIG. 12(b)

| Component types<br>Component cost ($) | Splitter<br>444 | Coupler<br>238 | Cable<br>1314 | Connector<br>657 | Jumper<br>230 |
|---|---|---|---|---|---|
| Splitter types<br>Number of splitters | | 2-way<br>1 | | 4-way<br>7 | |
| Jumper types<br>Number of jumpers | | 0.3 m<br>11 | | 1 m<br>4 | |
| Number of couplers | | | 29 | | |
| Cable types | ½" | ⅞" | 1¼" | 1⅝" | |
| Cable length (m) | 236.8 | 74.7 | 0 | 0 | |
| Number of connectors | 54 | 6 | 0 | 0 | |

Tables 16 and 17 provide details of these two types of topologies of FIG. 12(a) and FIG. 12(b) respectively, and it is shown that there is a small difference in the total required BTS transmission power.

Figure 13A:
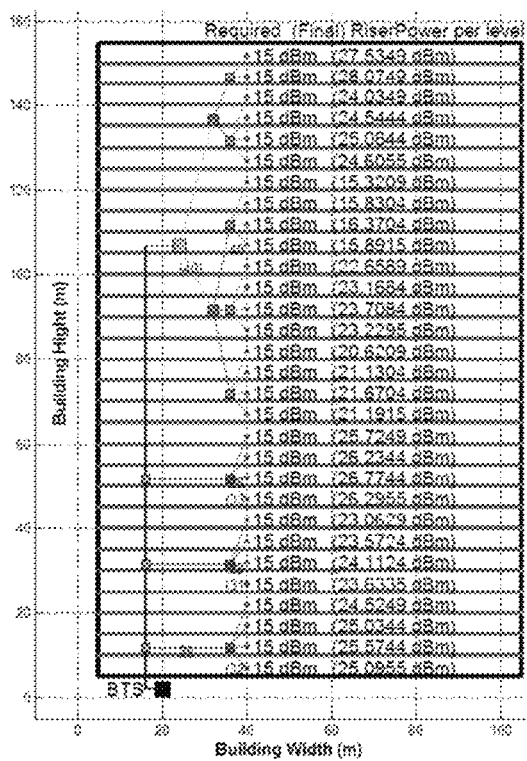
FIG. 13(a) and FIG. 13(b) illustrate the tree topology and the basic hybrid topology combined.
Figure 13B:
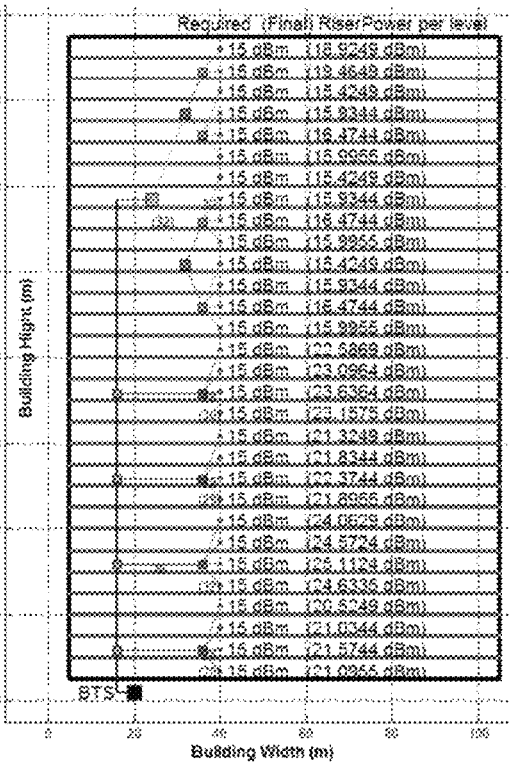

FIG. 13(a) and FIG. 13(b) illustrate the tree topology with multi-level cascades of splitters and the basic hybrid topology combined. FIG. 13(a) illustrates the hybrid topology with three couplers and two-level cascades of splitter connection, and FIG. 13(b) illustrates the hybrid topology with four couplers and two-level cascades of splitter connection.

TABLE 18

Details of hybrid topology of FIG. 13(a)

| Coupler<br>No. | Coupler<br>Type(dB) | Coupler<br>Location |
|---|---|---|
| #1 | 15 | (40, 11.7) |
| #2 | 15 | (40, 31.7) |
| #3 | 10 | (40, 51.7) |
| Required BTS Power (dBm) | | 49 |
| Total cost ($) | | 3798 |

| Component types<br>Component cost ($) | Splitter<br>568 | Coupler<br>120 | Cable<br>2171 | Connector<br>790 | Jumper<br>212 |
|---|---|---|---|---|---|
| Splitter types<br>Number of splitters | | 2-way<br>1 | | 4-way<br>7 | |
| Jumper types<br>Number of jumpers | | 0.3 m<br>4 | | 1 m<br>2 | |
| Number of couplers | | | 3 | | |
| Cable types | ½" | ⅞" | 1¼" | 1⅝" | |
| Cable length (m) | 80.9 | 49.7 | 55 | 0 | |
| Number of connectors | 20 | 4 | 2 | 0 | |

TABLE 19

Details of the vertical bus topology of FIG. 13(b)

| Coupler<br>No. | Coupler<br>Type(dB) | Coupler<br>Location |
|---|---|---|
| #1 | 15 | (40, 11.7) |
| #2 | 10 | (40, 31.7) |
| #3 | 10 | (40, 51.7) |
| #4 | 6 | (40, 71.7) |
| Required BTS Power (dBm) | | 45 |
| Total cost ($) | | 3166.7 |

TABLE 19-continued

Details of the vertical bus topology of FIG. 13(b)

| Component types<br>Component cost ($) | Splitter<br>558 | Coupler<br>160 | Cable<br>1516.5 | Connector<br>720 | Jumper<br>212 |
|---|---|---|---|---|---|
| Splitter types<br>Number of splitters | | 2-way<br>1 | | 4-way<br>7 | |
| Jumper types<br>Number of jumpers | | 0.3 m<br>6 | | 1 m<br>2 | |
| Number of couplers | | | 4 | | |

Tables 18 and 19 provide details of the hybrid topology of FIG. 13(a) and FIG. 13(b) respectively. Differences in the hybrid types can result in very different required total BTS transmission power and total cost.

Figures 14A, 14B:
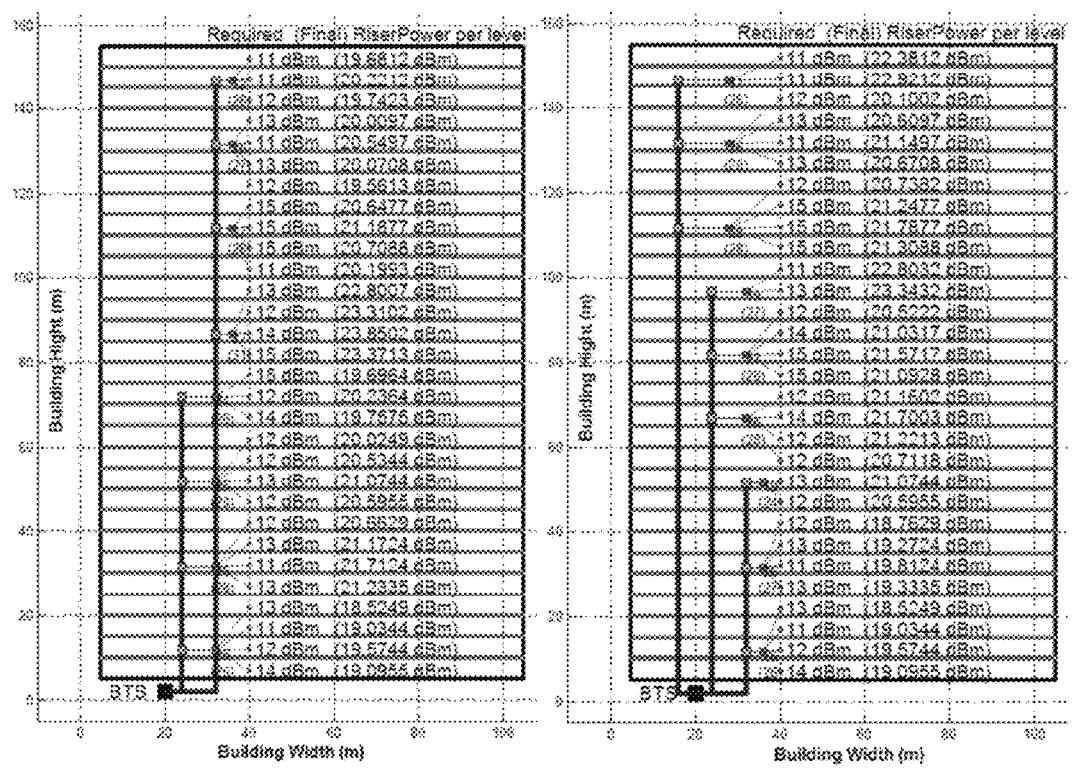
FIG. 14(a) illustrates the basic hybrid topology with two buses.
FIG. 14(b) illustrates the basic hybrid topology with three buses.

FIG. 14(a) illustrates the basic hybrid topology with two buses, and FIG. 14(b) illustrates the basic hybrid topology with three buses.

TABLE 20

Details of basic hybrid topology of FIG. 14(a)

| Coupler<br>No. | Coupler<br>Type(dB) | Coupler<br>Location |
|---|---|---|
| #1 | 6 | (40, 86.7) |
| #2 | 6 | (40, 111.7) |
| #3 | 3 | (40, 131.7) |
| #4 | 10 | (40, 11.7) |
| #5 | 6 | (40, 31.7) |
| #6 | 3 | (40, 51.7) |
| Required BTS Power (dBm) | | 42.8 |
| Total cost ($) | | 4635 |

| Component types<br>Component cost ($) | Splitter<br>482 | Coupler<br>196 | Cable<br>2867 | Connector<br>830 | Jumper<br>259 |
|---|---|---|---|---|---|
| Splitter types<br>Number of splitters | | 2-way<br>3 | 3-way<br>1 | 4-way<br>6 | |
| Jumper types<br>Number of jumpers | | 0.3 m<br>5 | | 1 m<br>2 | |
| Number of couplers | | | 6 | | |
| Cable types | ½" | ⅞" | 1¼" | 1⅝" | |
| Cable length (m) | 111 | 50 | 0 | 0 | |
| Number of connectors | 26 | 4 | 0 | 0 | |

TABLE 21

Details of the basic hybrid topology of FIG. 14(b)

| Coupler<br>No. | Coupler<br>Type(dB) | Coupler<br>Location |
|---|---|---|
| #1 | 6 | (40, 11.7) |
| #2 | 3 | (40, 31.7) |
| #3 | 6 | (40, 66.7) |
| #4 | 3 | (40, 81.7) |
| #5 | 6 | (40, 111.7) |
| #6 | 3 | (40, 131.7) |
| Required BTS Power (dBm) | | 42.7 |
| Total cost ($) | | 5804 |

TABLE 21-continued

Details of the basic hybrid topology of FIG. 14(b)

| Component types | Splitter | Coupler | Cable | Connector | Jumper |
|---|---|---|---|---|---|
| Component cost ($) | 510 | 116 | 4057 | 830 | 291 |

| Splitter types | 2-way | 3-way | 4-way |
|---|---|---|---|
| Number of splitters | 3 | 1 | 6 |

| Jumper types | 0.3 m | 1 m |
|---|---|---|
| Number of jumpers | 3 | 2 |

| Number of couplers | 6 |
|---|---|

| Cable types | ½" | ⅞" | 1¼" | 1⅝" |
|---|---|---|---|---|
| Cable length (m) | 81 | 0 | 130 | 0 |
| Number of connectors | 18 | 0 | 2 | 0 |

Tables 20 and 21 provides details of the topology of FIG. 14(a) and FIG. 14(b) respectively. The topology with three buses uses more cable and results in a higher component cost, while the required BTS power is similar.

Cable Type Adjustment

The initial cable type selection is based on cable length between components, as described earlier. It may, however, be possible to include further power consumption efficiency by selecting a different cable size. For example, it is possible that the cable length between components is little and then many cables with small sizes are used. Consequently, more transmission power from the BTS is required due to the high power attenuation of ½" and ⅞" cables. If cost allows, thicker cables can replace the thinner cables starting from the BTS to save the power consumption.

Figure 15:
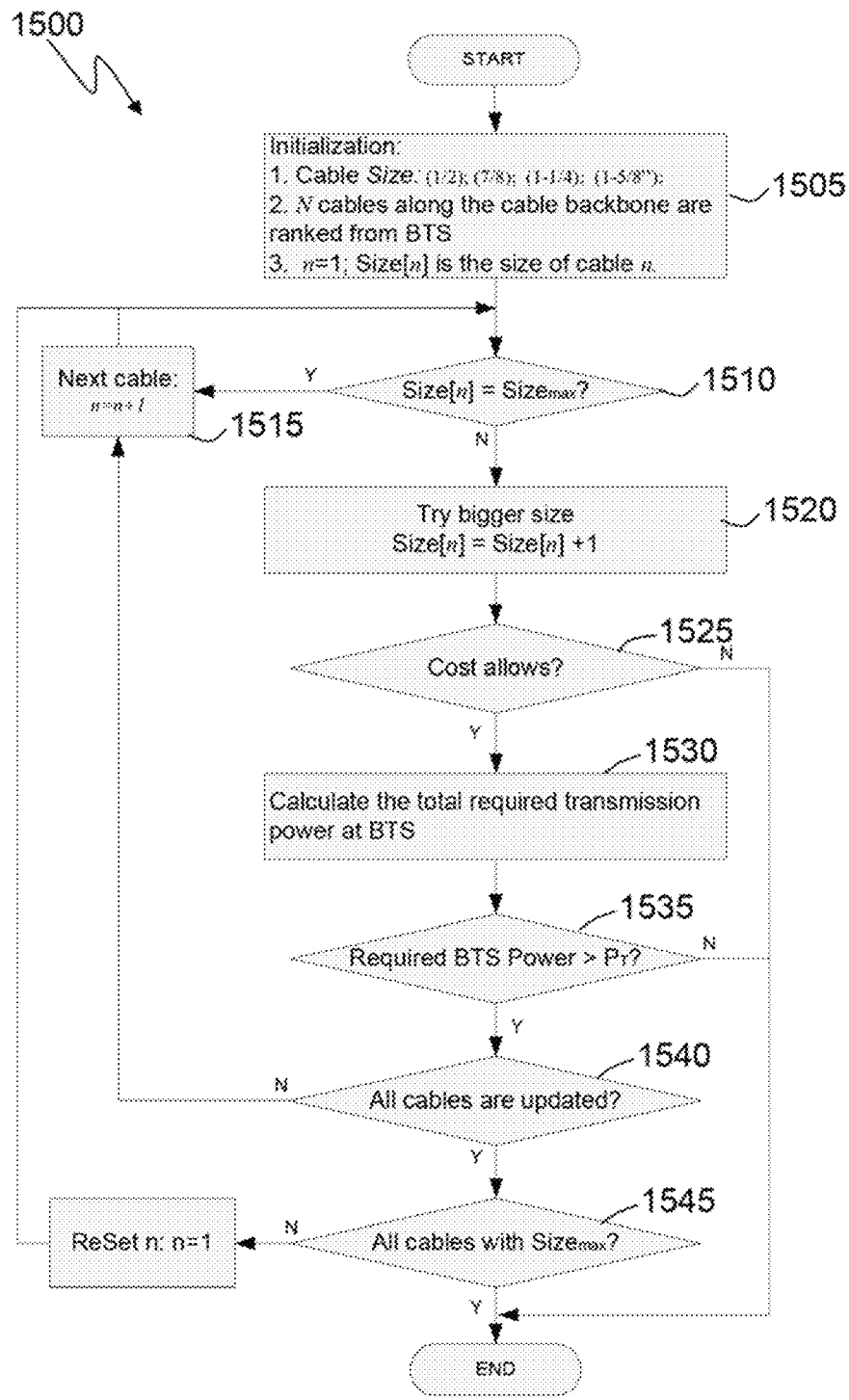
FIG. 15 diagrammatically illustrates a method 1500 of adjusting the cable size, according to an embodiment of the present invention.

FIG. 15 diagrammatically illustrates a method 1500 of adjusting the cable size, according to an embodiment of the present invention. Given four possible types of cable, namely ½", ⅞", 1¼" and 1⅝", and the total cables are $$\{N_x\}_{x=1}^X$$

ranking with the ascending size.

In step 1505, the method is initialized and the cables along the cable backbone (bus and hybrid topologies) are $$\{N_x\}_{x=1}^X$$

ranked starting from the BTS. The cable size adjustment starts from the cable connected to the BTS.

At step 1510, it is determined if the cable is the maximum cable size. If yes, the next cable is chosen for analysis in step 1515. If no, the next cable size larger is tested in step 1520.

In step 1525, it is determined if costs allow for the new cable size. If not, the method is completed. If yes, the total required BTS transmission power is calculated in 1530.

If the total required BTS transmission power still exceeds the maximum allowed transmission power, $P_T$, as described in step 1535, it is checked if all cables are updated in step 1540. Otherwise the method is concluded.

If not all cables have been updated, as determined in 1540, the next cable size is chosen in step 1515.

If all cables have the maximum size, as determined in step 1545, the method from step 1510 is repeated from the first cable.

Reduce the Total Component Cost Further

Figure 16:
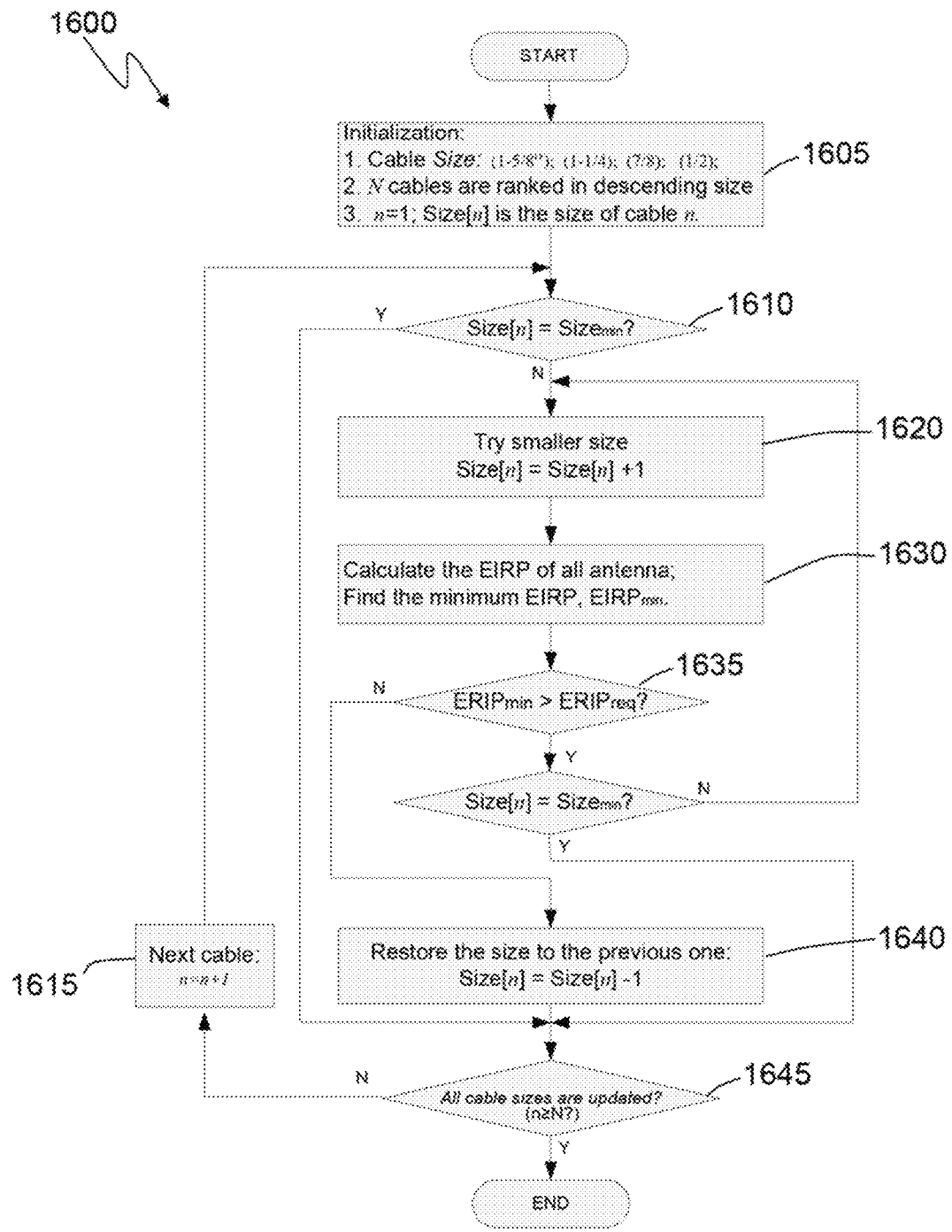
FIG. 16 describes a method of reducing the cost further.

The cable contributes much cost in the component placement. FIG. 16 describes a method of reducing the cost further.

At step 1605, the method is initialised. Given that there are four cable sizes, ½", ⅞", 1¼" and 1⅝", the total cables are $$\{N_y\}_{y=1}^Y$$

rank with the descending size. The cable size adjustment starts from the cable with the largest size, y=1.

At step 1610, it is determined if the cable size is the minimum cable size. If yes, the next cable is selected in step 1615. If no, the smaller cable size is chosen in step 1620. At step 1630 antenna EIRPs are calculated. In step 1635, it is determined if the EIRP meets the minimum EIRP requirements, and if so one lower level size will be tried until the updated minimum antenna EIRP exceeds the EIRP requirement exactly by repeating steps 1620-1635 if the lower level size is not the minimum size. If the minimum EIRP fails to satisfy the EIRP requirement, the cable size will be set to the previous size in step 1640.

At step 1645, it is determined if all the cable sizes have been updated. If no, the next cable is selected in step 1615. If yes, the method is concluded.

Non-Placement Area Avoidance

Figure 17A:
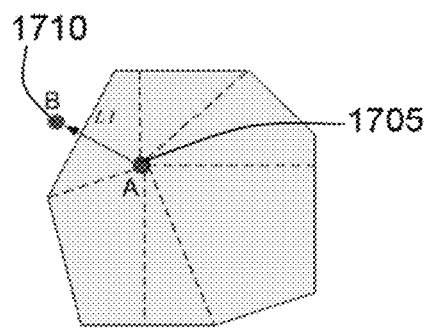
FIG. 17a illustrates a convex shape and FIG. 17b illustrates a concave shape of a non-placement area.
Figure 17B:
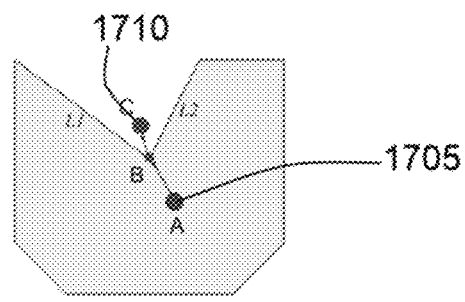

In addition to choosing component types and locations according to the previously described methods, non-placement area avoidance can be considered. The non-placement area could be a polygon with any shape. FIG. 17a illustrates a convex shape and FIG. 17b illustrates a concave shape of a non-placement area.

At first, the available shifting directions are selected because some boundaries of non-placement area could coincide with the floor plan boundaries. Secondly, the distance from the component to each border of the polygon from all available directions can be calculated by Heron's formula and the direction with the minimum distance is chosen. Therefore, for the convex non-placement area avoidance, the component located at position 1705 will be moved to 1710 with a certain distance, e.g., 0 or 0.5 m, from the border L1 along the perpendicular line to L1. If the non-placement area is a cylinder pillar area, the movement direction is from the component to the point on the circle nearest to the component. In addition, there is a special case that if the non-placement area is concave and the component A is placed close to the concave vertex B. In this case, the perpendicular line with the minimum length is the one from location 1705 to L1, but it doesn't have intersection point with L1. Consequently, the perpendicular direction to L1 is unavailable. To move the component from position 1705 out of the area with some distance from boundaries, the updated location 1710 would be the final location which has the same distance to L1 and L2.

Riser Location Selection

Figure 18:
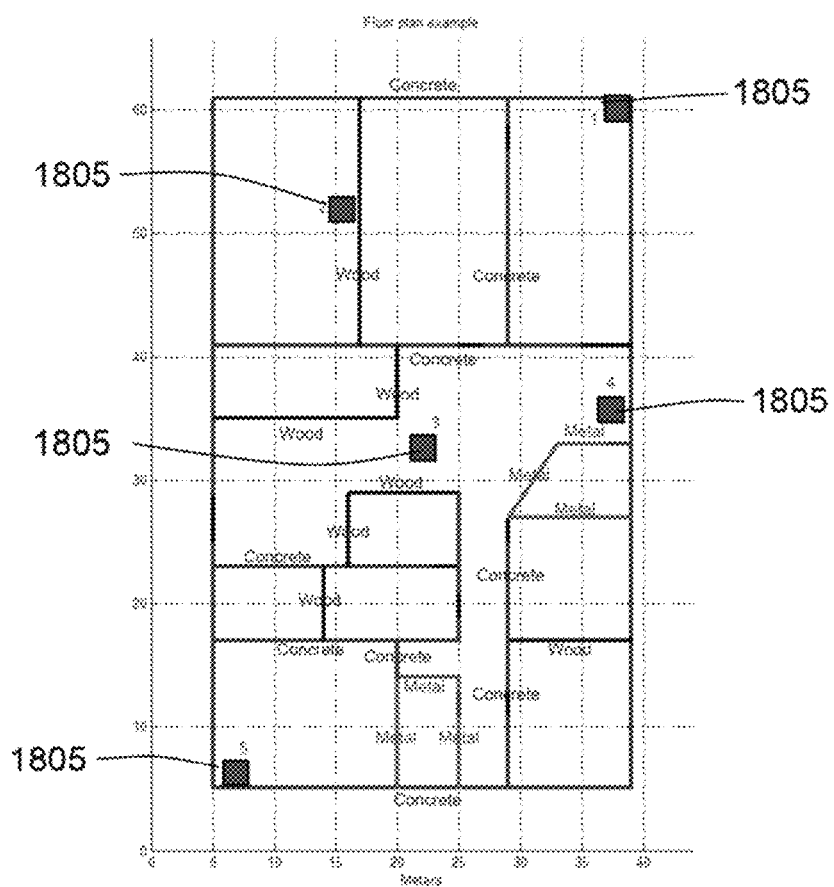
FIG. 18 illustrates a floor plan, including possible riser location options.

FIG. 18 illustrates a floor plan, including possible riser location options 1805. For each possible riser location 1805, several solutions with different topologies are generated using the methods 300, 400 and/or 600 described earlier. Given design requirements, such as cost limitation and maximum utilization of BTS transmission power, all horizontal and vertical solutions based on different riser locations are generated and, referring to the desirable design target, the best or most suitable solution is chosen from these solutions.

System Upgrade and Adjustment

In terms of the service upgrade, such as the upgrade from 2G system to 3G or 4G, additional antennas will be installed due to higher frequency bands and data rates to be supplied. In order to avoid many changes of the current cable installation, the methods described herein need not re-determine all designs based on all antennas, but can determine the additional component types and locations based on the existing design. The additional antennas which have the cable length less than $L_{max}$ to the backbone will be connected by couplers. The coupler will also be used to connect the additional antenna if its number is only one. For those antennas, more than one, which have the cable length more than $L_{max}$ to the backbone, the splitters with more output numbers could replace the current ones close to the additional antennas. More splitters are placed with the tree topology if the closest splitters already have the maximum output numbers.

Figure 19:
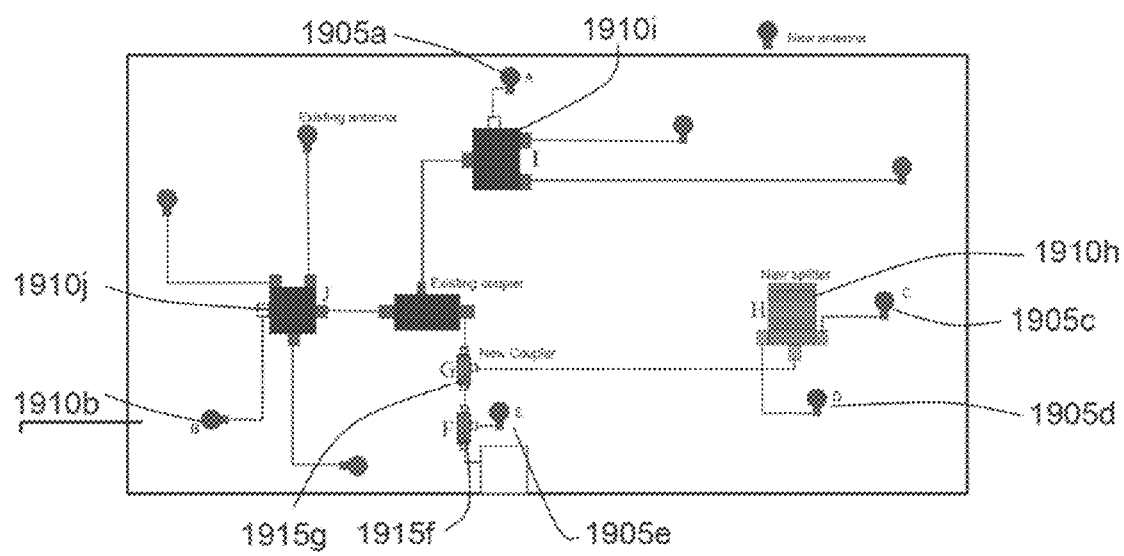
FIG. 19 illustrates a system upgrade and adjustment solution according to an embodiment of the present invention.

FIG. 19 illustrates a system upgrade and adjustment solution according to an embodiment of the present invention. Five additional antennas 1905a-e, are placed, which are to be connected. Splitter 1910i, positioned close to antenna 1905a, is updated to be a 3-way splitter to connect the antenna 1905a. Similarly, antenna 1905b is connected to splitter 1910j by changing splitter 1910j from a 3-way splitter to a 4-way splitter. A new coupler, 1915f, is placed to connect antenna 1905e and new 2-way 1910h connects antenna 1905c and 1905d. Another new coupler 1915g is used to connect the splitter 1910h.

Figure 20:
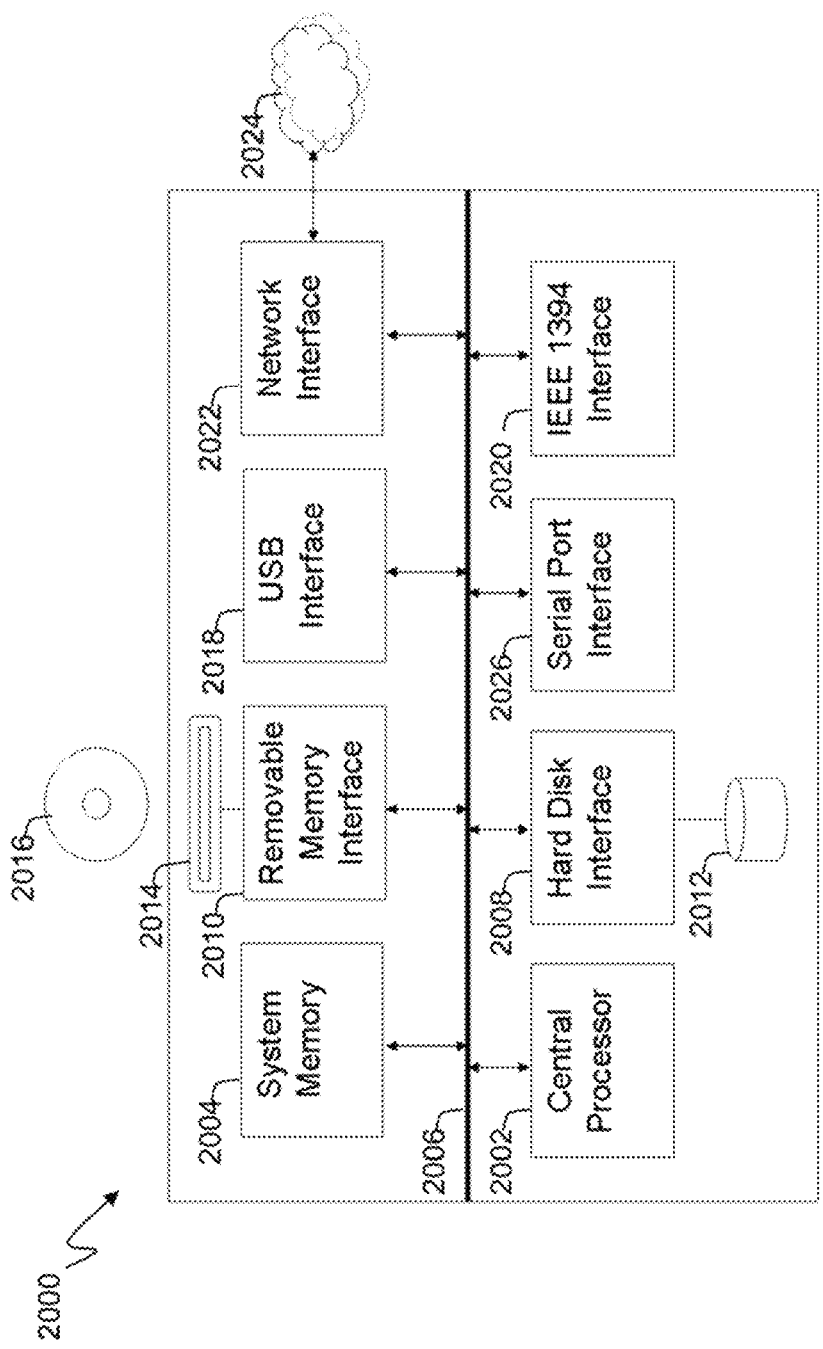
FIG. 20 diagrammatically illustrates a computer, according to an embodiment of the present invention.

FIG. 20 diagrammatically illustrates a computer 2000, according to an embodiment of the present invention.

The computer 2000 includes a central processor 2002, a system memory 2004 and a system bus 2006 that couples various system components, including coupling the system memory 2004 to the central processor 2002. The system bus 2006 may be any of several types of bus structures including a memory bus or memory controller, a peripheral bus, and a local bus using any of a variety of bus architectures. The structure of system memory 2004 is well known to those skilled in the art and may include a basic input/output system (BIOS) stored in a read only memory (ROM) and one or more program modules such as operating systems, application programs and program data stored in random access memory (RAM).

The computer 2000 may also include a variety of interface units and drives for reading and writing data. In particular, the computer 2000 includes a hard disk interface 2008 and a removable memory interface 2010, respectively coupling a hard disk drive 2012 and a removable memory drive 2014 to the system bus 2006. Examples of removable memory drives 2014 include magnetic disk drives and optical disk drives. The drives and their associated computer-readable media, such as a Digital Versatile Disc (DVD) 2016 provide non-volatile storage of computer readable instructions, data structures, program modules and other data for the computer system 2000. A single hard disk drive 2012 and a single removable memory drive 2014 are shown for illustration purposes only and with the understanding that the computer 2000 may include several similar drives. Furthermore, the computer 2000 may include drives for interfacing with other types of computer readable media.

The computer 2000 may include additional interfaces for connecting devices to the system bus 2006. FIG. 20 shows a universal serial bus (USB) interface 2018 which may be used to couple a device to the system bus 2006. For example, an IEEE 1394 interface 2020 may be used to couple additional devices to the computer 2000.

The computer 2000 can operate in a networked environment using logical connections to one or more remote computers or other devices, such as a computer, a router, a network personal computer, a peer device or other common network node, a wireless telephone or wireless personal digital assistant. The computer 2000 includes a network interface 2022 that couples the system bus 2006 to a local area network (LAN) 2024. Networking environments are commonplace in offices, enterprise-wide computer networks and home computer systems.

A wide area network (WAN), such as the Internet, can also be accessed by the computer 2000, for example via a modem unit connected to a serial port interface 2026 or via the LAN 2024.

It will be appreciated that the network connections shown and described are exemplary and other ways of establishing a communications link between the computers can be used. The existence of any of various well-known protocols, such as TCP/IP, Frame Relay, Ethernet, FTP, HTTP and the like, is presumed, and the computer 2000 can be operated in a client-server configuration to permit a user to retrieve web pages from a web server. Furthermore, any of various conventional web browsers can be used to display and manipulate data on web pages.

The operation of the computer 2000 can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

Figure 21:
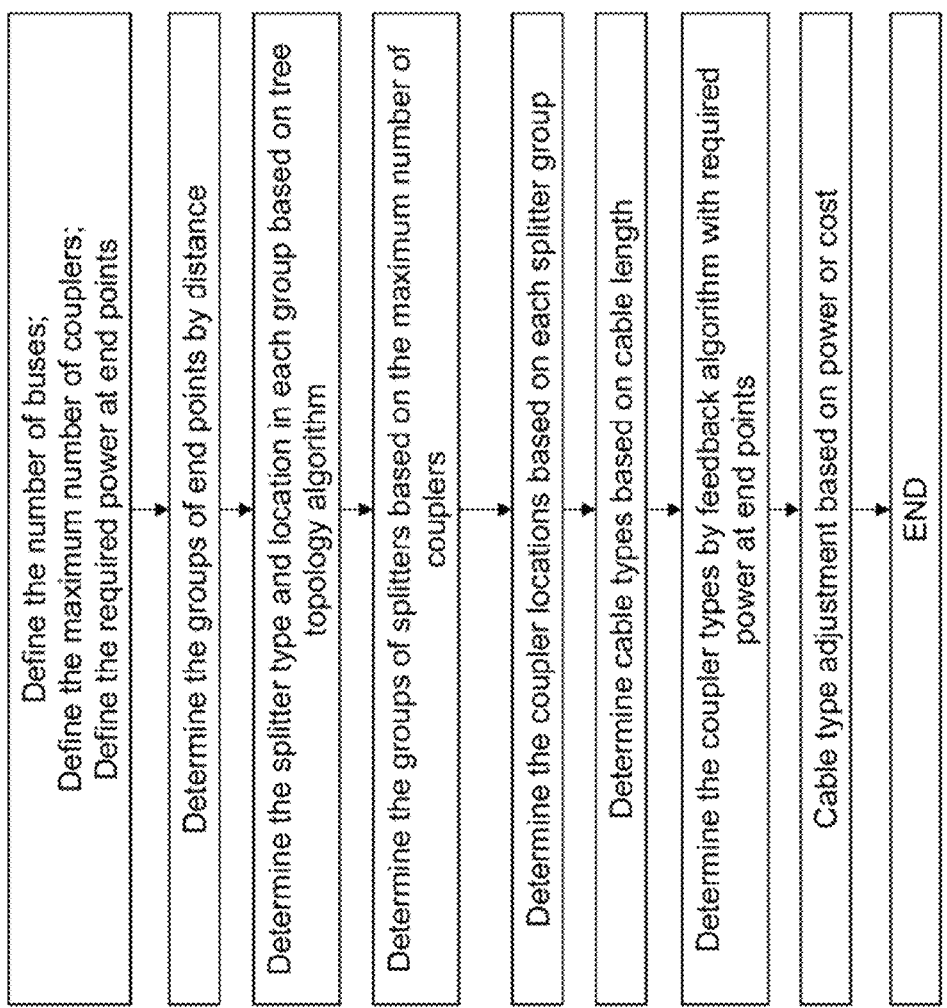
FIG. 21 illustrates a selection of component types in a hybrid topology.

FIG. 21 describes the determination of component types and locations in a hybrid topology. In the initialization, the total number of buses should be defined. The maximum number of couplers used could determine the basic hybrid or combined hybrid topology because basic hybrid uses more couplers. The required power at end points will be used to determine the coupler types in a feedback algorithm discussed in FIG. 6.

The method described for tree topology is used to determine the splitter types and locations.

For hybrid topology, fewer couplers but more splitters are used, which consist of multi-level cascade connections of splitters.

In order to increase the power consumption efficiency or reduce the total cost further, cable types are adjusted further as shown in FIG. 15 and FIG. 16.

In summary, advantages of some embodiments of the present invention include guaranteeing the requirements of installed antennas, transmission power or financial budget. Network upgrade is simplified. These capabilities provide a user with a powerful and flexible design environment for wireless networks, which allows users to quickly and easily achieve optimal solutions with lowest cost for designing multiple service coverage areas according to different defined requirements.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A computer implemented method of determining component types and locations in a network design, the method including:
   a. determining, by a computer processor, the component types and locations according to a riser location as an entry point and antenna locations as a plurality of end points, in a floor plan;
   b. determining, by a computer processor, the minimum required transmission power at a riser location to meet antenna equivalent isotropically radiated power (EIRP) requirements in a floor plan;
   c. determining, by a computer processor, the best riser location from available riser locations according to cost limitation or power transmission efficiency in a floor plan;
   d. determining, by a computer processor, the component types and locations according to a Base Transceiver Station (BTS) location as an entry point and riser locations in different floors as a plurality of end points, in a building plan;
   e. determining, by a computer processor, the minimum required BTS transmission power to meet said minimum required transmission power at each riser location calculated;
   f. updating, by a computer processor, the component locations based upon areas specified as component non-placement area;
   g. determining, by a computer processor, the initial types of cables according to the lengths of each cable;
   h. adjusting, by a computer processor, sizes of some cables to increase power transmission efficiency from a BTS to antennas if the total cost budget allows;
   i. adjusting, by a computer processor, the sizes of some cables to reduce the cable cost with the satisfaction of the antenna EIRP requirement;
   j. determining, by a computer processor, types and locations of new components, and updating, by a computer processor, existing component types, according to the locations of new antennas for the system to be enhanced or upgraded to accept a new technology.

2. A method according to claim 1, wherein the computer implemented method of determining component types and locations according to an entry point and a plurality of end points in a floor plan or in a building plan include,
   a. determining the number, types and locations of splitters and cable types according to an entry point and a plurality of end points, in a tree topology;
   b. determining the number, types and locations of couplers and cable types according to an entry point and a plurality of end points, in a bus topology;
   c. determining the number, types and locations of splitters, couplers and cable types according to an entry point and a plurality of end points, in a hybrid topology;
   d. determining the minimum required transmission power at an entry point according to the minimum required power at each end point in a tree, bus or hybrid topology.

3. A method according to claim 2, wherein the option to choose tree, bus or hybrid topology in a floor plan or a building plan is determined based upon the floor plan, building plan, product availability, or by any other suitable means.

4. A method according to claim 2, wherein the steps of determining the number, types and locations of splitters in a tree topology to a plurality of end points, which may be antenna locations, and an entry point, which may be a riser location, include,
   a. determining the number, types and locations of a first set of splitters, wherein each end point is connected to one splitter of the first set of splitters;
   b. determining iteratively the number, types and locations of any subsequent sets of splitters wherein each splitter in the set of splitters from the previous iteration is connected to one splitter of the new set of splitters; and
   c. determining the type and locations of one final splitter wherein each remaining unconnected splitter from the first set of splitters or any subsequent set of splitters is connected to the final splitter and the entry point is connected to the final splitter.

5. A method according to claim 4, wherein the steps of determining the number, types and locations of splitters to be connected to a plurality of end points as at least part of a tree topology include,
   a. defining types of available splitters by deciding the maximum number of outputs of splitters;
   b. determining number and types of splitters from available types of splitters based at least partly on the number of a plurality of end points and the remainder relationship between the number of splitter outputs and the number of end points;
   c. determining a group including one or two splitters, the number of outputs of each splitter which is smaller than the predefined number of maximum number of outputs;
   d. determining the locations of splitters in said group based at least partly on the locations of the plurality of end points to be connected and the cable length;
   e. determining the locations of the remaining splitters based at least partly on the lengths of cables and the locations of the plurality of end points to be connected.

6. A method according to claim 5, wherein the maximum number of outputs of splitters may be determined based on product availability, or by any other suitable means.

7. A method according to claim 4 or 5, wherein the minimum required transmission power at a riser location, is calculated based upon the required transmission power at antennas, the power loss of cables and the insertion loss of splitters.

8. A method according to claim 4, wherein the steps of determining types of splitters to be connected to splitters connected to a plurality of end points in a tree topology include, a. determining the number, types and locations of one or more further sets of splitters based on computer executable instructions for performing the method of claim 4 according to the number of pre-existing splitters as the end points;
   b. determining the type and location of the last splitter to be connected to an entry point, then all end points are connected to the said last splitter via one or more further set of splitters.

9. A method according to claim 2, wherein the steps of determining the number, types and locations of couplers in a bus topology with a plurality of end points, which may be antenna locations, and an entry point, which may be a riser location, include,
   a. defining the number and orientation of buses, which are cable backbones;
   b. grouping the end points according to said number and orientation of buses based upon the distance from each end point to the bus;

c. determining the locations of buses according to the locations of the end points in said respective groups;
d. determining the locations of couplers along the cable backbones according to said end points to be connected by couplers;
e. determining the types of couplers to be connected to said end points from available types of couplers based on the required transmission power at end points.

10. A method according to claim 9, wherein the options of the number and orientation of buses in a floor plan or a building plan are determined based upon the floor plan, building plan, product availability, or by any other suitable means.

11. A method according to claim 9, wherein the steps of determining the types of said couplers includes,
a. determining the types of couplers by the order from the coupler closest to the entry point to the coupler closest to end points;
b. searching the type of each coupler from available coupler types to just meet the minimum power requirement at each end point according to the power level at the entry point;
c. updating the types of couplers to balance the power allocated at each end point by increasing the minimum power requirement at each end point.

12. A method according to claim 11, wherein the power level at the entry point is initialized in the start stage and then updated according to the available coupler types and minimum power requirements at end points.

13. A method according to claim 11, wherein the power at each end point is calculated based upon the coupling loss and direct loss of each coupler.

14. A method according to claim 2, wherein the steps of determining the number, types and locations of splitters and couplers in a hybrid topology with a plurality of end points, which may be antenna locations, and an entry point, which may be a riser location, include, a. defining the maximum cable length, which is a threshold, from the end points to the bus(es) to determine the end points to be connected by couplers, and the end points to be connected by splitters;
b. connecting the end point that have a cable length less than a threshold directly to the bus(es) via couplers;
c. determining the types and locations of couplers;
d. connecting the remaining end points to the bus(es) via splitters;
e. determining the types and locations of splitters;
f. connecting the splitters to the bus(es) via couplers.

15. A method according to claim 14, wherein the said maximum cable length is defined based upon the floor plan, building plan, product availability, or by any other suitable means.

16. A method according to claim 14, wherein the end points to be connected by splitters and couplers respectively can also be determined according to the cable length from the entry point to end points.

17. A method according to claim 2, wherein the minimum requirement transmission power at the entry point is calculated based on the required power at the end points.

18. A method according to claim 1, wherein the best riser location could be different in the tree, bus and hybrid networks as there may be no single best location for all three topologies.

19. A method according to claim 1, wherein some cables are selected to be adjusted in size by searching all cables in the network and verifying total cost budget or required transmission at the entry point and end points.

20. A method according to claim 1, wherein the steps of determining the number, types and locations of splitters and couplers to be added to an existing network design and connected to a plurality of new or existing end points, which may be antenna locations, when the system is enhanced or upgraded to accept a new technology, include
a. determining the types and locations of new couplers according to the end points to be connected by couplers if the end points have cable length less than the maximum cable length, which is a threshold, to the backbone;
b. determining the types and locations for the replacement of existing splitters with higher output numbers according to requirements of new and/or existing end points if the end points have cable length more than the maximum cable length, which is a threshold, to the backbone; and
c. determining the types and locations of new splitters to connect to the end points if the closest splitters already have the maximum number of outputs.

21. A method according to claim 20, wherein required transmission power at the entry point is re-calculated in cases of network design for system upgrade and enhancement.

22. A method according to any one of the preceding claims, wherein a set of solutions to connect an entry point to a plurality of end points is derived, the best solution from them can be chosen according to the specific requirements from design specification, building environments determined by floor plans and building plans, limitation of transmission power, cost budget, etc.

23. The method of claim 1 further including:
a. determining that an endpoint of the plurality of endpoints has a transmission power difference with the required transmission of the endpoint greater than a threshold;
b. increasing the required transmission power for each of the endpoints of the plurality of endpoints by a predetermined increment;
c. determining the component types and locations are based upon at least the increased transmission power requirements.

* * * * *